US009013634B2

(12) United States Patent
Agarwala et al.

(10) Patent No.: US 9,013,634 B2
(45) Date of Patent: Apr. 21, 2015

(54) METHODS AND APPARATUS FOR VIDEO COMPLETION

(75) Inventors: Aseem O. Agarwala, Seattle, WA (US); Daniel Goldman, Seattle, WA (US); Daniel H. Leventhal, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 356 days.

(21) Appl. No.: 12/954,445

(22) Filed: Nov. 24, 2010

(65) Prior Publication Data

US 2013/0128121 A1  May 23, 2013

Related U.S. Application Data

(60) Provisional application No. 61/382,824, filed on Sep. 14, 2010.

(51) Int. Cl.
*H04N 5/14* (2006.01)
*G06T 5/00* (2006.01)
*G06T 3/00* (2006.01)
*G11B 27/031* (2006.01)
*H04N 13/00* (2006.01)
*H04N 13/02* (2006.01)
*G06T 7/20* (2006.01)

(52) U.S. Cl.
CPC .............. *G06T 5/005* (2013.01); *G06T 3/0093* (2013.01); *G11B 27/031* (2013.01); *H04N 13/0055* (2013.01); *H04N 13/0221* (2013.01); *G06T 7/2033* (2013.01); *G06T 2207/10016* (2013.01); *G06T 2207/20182* (2013.01); *G06T 2207/30241* (2013.01); *G06T 2207/30244* (2013.01)

(58) Field of Classification Search
USPC ......................................................... 348/701
See application file for complete search history.

(56) References Cited

U.S. PATENT DOCUMENTS

| 7,424,150 | B2 | 9/2008 | Cooper et al. |
| 7,978,925 | B1 | 7/2011 | Souchard |
| 8,872,928 | B2 | 10/2014 | Jin et al. |
| 2008/0112642 | A1 | 5/2008 | Matsushita |
| 2008/0212687 | A1 | 9/2008 | Liu |
| 2009/0278921 | A1 | 11/2009 | Wilson |
| 2009/0285544 | A1* | 11/2009 | Fitzgibbon et al. ............. 386/52 |
| 2010/0026712 | A1* | 2/2010 | Aliprandi et al. ............. 345/629 |
| 2010/0046843 | A1* | 2/2010 | Ma et al. ....................... 382/224 |

(Continued)

OTHER PUBLICATIONS

U.S. Appl. No. 12/953,703, filed Nov. 24, 2010.

(Continued)

*Primary Examiner* — Richard Torrente
(74) *Attorney, Agent, or Firm* — Wolfe-SBMC

(57) ABSTRACT

Methods, apparatus, and computer-readable storage media for video completion that may be applied to restore missing content, for example holes or border regions, in video sequences. A video completion technique applies a subspace constraint technique that finds and tracks feature points in the video, which are used to form a model of the camera motion and to predict locations of background scene points in frames where the background is occluded. Another frame where those points were visible is found, and that frame is warped using the predicted points. A content-preserving warp technique may be used. Image consistency constraints may be applied to modify the warp so that it fills the hole seamlessly. A compositing technique is applied to composite the warped image into the hole. This process may be repeated until the missing content is filled on all frames.

20 Claims, 14 Drawing Sheets

(56) References Cited

U.S. PATENT DOCUMENTS

2010/0053347 A1  3/2010  Agarwala
2013/0120600 A1  5/2013  Jin

OTHER PUBLICATIONS

Zhang, G., Hua, W., Qin, X., Shao, Y., and Bao, H. 2009. Video stabilization based on a 3d perspective camera model. The Visual Computer 25, 11, 997-1008.
Singular value decomposition, downloaded from http://en.wikipedia.org/wiki/Singualr_value_decomposition[Nov. 29, 2010 10:47:04 AM] on Nov. 29, 2010, 14 pages.
Bhat, P., Zitnick, C. L., Snavely, N., Agarwala, A., Agrawala, M., Cohen, M., Curless, B., and Kang, S. B. 2007. Using photographs to enhance videos of a static scene. In Rendering Techniques 2007: 18th Eurographics Workshop on Rendering, 327-338.
Brand, M. 2002. Incremental singular value decomposition of uncertain data with missing values. In 7th European Conference on Computer Vision (ECCV 2002), 707-720.
Buchanan, A. M., and Fitzgibbon, A. 2005. Damped Newton algorithms for matrix factorization with missing data. In IEEE Computer Society Conference on Computer Vision and Pattern Recognition, 316-322.
Buehler, C., Bosse, M., and McMillan, L. 2001. Non-metric image-based rendering for video stabilization. In 2001 Conference on Computer Vision and Pattern Recognition (CVPR 2001), 609-614.
Igarashi, et al. "As-Rigid-As-Possible Shape Manipulation" ACM Transactions on Graphics 2005.
Chen, B.-Y., Lee, K.-Y., Huang, W.-T., and Lin, J.-S. 2008. Capturing intention-based full-frame video stabilization. Computer Graphics Forum 27, 7, 1805-1814.
Chen, P. 2008. Optimization algorithms on subspaces: Revisiting missing data problem in low-rank matrix. Int. J. Comput. Vision 80, 1, 125-142.
Davison, A. J., Reid, I. D., Molton, N. D., and Stasse, O. 2007. MonoSLAM: Real-time single camera SLAM. IEEE Transactions on Pattern Analysis and Machine Intelligence 26, 6, 1052-1067.
Fitzgibbon, A., Wexler, Y., and Zisserman, A. 2005. Image-based rendering using image-based priors. International Journal of Computer Vision 63, 2 (July), 141-151.
Avidan, et al. "Seam Carving for Content-Aware Image Resizing" ACM Transactions on Graphics 2007.
Goh, A., and Vidal, R. 2007. Segmenting motions of different types by unsupervised manifold clustering. In IEEE Computer Vision and Pattern Recognition (CVPR), 1-6.
Irani, M. 2002. Multi-frame correspondence estimation using subspace constraints. International Journal of Computer Vision 48, 1, 39-51.
Lee, J., and Shin, S. Y. 2002. General construction of time domain filters for orientation data. IEEE Transactions on Visualization and Computer Graphics 8, 2 (April-June), 119-128.
Lee, K.-Y., Chuang, Y.-Y., Chen, B.-Y., and Ouhyoung, M. 2009. Video stabilization using robust feature trajectories. In IEEE ICCV.
Liu, F., Gleicher, M., Jin, H., and Agarwala, A. 2009. Content-preserving warps for 3d video stabilization. ACM Transactions on Graphics (Proceedings of SIGGRAPH 2009) 28, 3 (Aug.), Article No. 44.
Matsushita, Y., Ofek, E., GE, W., Tang, X., and Shum, H.-Y. 2006. Full-frame video stabilization with motion inpainting. IEEE Transactions on Pattern Analysis andMachine Intelligence 28, 7, 1150-1163.
Morimoto, C., and Chellappa, R. 1997. Evaluation of image stabilization algorithms. In DARPA Image Understanding Workshop DARPA97, 295-302.
Nister, D., Naroditsky, O., and Bergen, J. 2004. Visual odometry. In IEEE Computer Vision and Pattern Recognition (CVPR), 652-659.
Shi, J., and Tomasi, C. 1994. Good features to track. In IEEE Conference on Computer Vision and Pattern Recognition, 593-600.
Sinha, S., Frahm, J.-M., Pollefeys, M., and Genc, Y. 2006. Gpu-based video feature tracking and matching. In Workshop on Edge Computing Using New Commodity Architectures (Edge 2006).
Tomasi, C., and Kanade, T. 1992. Shape and motion from image streams under orthography: a factorization method. Int. J. Comput. Vision 9, 2, 137-154.
Torr, P. H. S., Fitzgibbon, A. W., and Zisserman, A. 1999. The problem of degeneracy in structure and motion recovery from uncalibrated image sequences. International Journal of Computer Vision 32, 1, 27-44.
Vidal, R., Tron, R., and Hartley, R. 2008. Multiframe motion segmentation with missing data using power factorization and gpca. Int. J. Comput. Vision 79, 1, 85-105.
Gal, et al. "Feature-aware Texturing" School of Computer Science, Tel Aviv University, Israel; Draft version. The original paper appeared in EGSR '06 proceedings.
Agarwala, A., Dontcheva, M., Agrawala, M., Drucker, S., Colburn, A., Curless, B., Salesin, D., and Cohen, M. 2004. Interactive digital photomontage. ACM Transactions on Graphics (TOG) (Jan).
Agarwala, A., Hertzmann, A., Salesin, D., and Seitz, S. 2004. Keyframe-based tracking for rotoscoping and animation. SIGGRAPH '04: SIGGRAPH 2004 Papers (Aug).
Barnes, C., Shechtman, E., Finkelstein, A., and Goldman, D. 2009. Patchmatch: a randomized correspondence algorithm for structural image editing. ACM Transactions on Graphics 28, 3, 2.
Jain, V., and Narayanan, P. 2006. Video completion for indoor scenes. Computer Vision, Graphics and Image Processing: 5th Indian Conference, Icvgip 2006, Madurai, India, Dec. 13-16, 2006, Proceedings, 409.
Jia, Y., Hu, S., and Martin, R. 2005. Video completion using tracking and fragment merging. The Visual Computer 21, 8, 601-610.
Ke, Q., and Kanade, T. 2001. A subspace approach to layer extraction. IEEE Computer Society Conference on Computer Vision and Pattern Recognition 1.
Kokaram, A., Collis, B., and Robinson, S. 2003. A Bayesian framework for recursive object removal in movie post production. IEEE International Conference on Image Processing, Barcelona.
Lucas, B., and Kanade, T. 1981. An iterative image registration technique with an application to stereo vision. International joint conference on artificial Intelligence (IJCIA) . . . (Jan).
Perez, P., Gangnet, M., and Blake, A. 2003. Poisson image editing. ACM Transactions on Graphics (Jan).
Shih, T., Tang, N., Yeh, W., Chen, T., and Lee, W. 2006. Video inpainting and implant via diversified temporal continuations. Proceedings of the 14th annual ACM international conference on Multimedia, 136.
Shiratori, T., Matsushita, Y., Kang, S.B., and Tang, X. 2006. Video completion by motion field transfer. Proceedings of CVPR 2006 (Jan).
Wexler, Y., Shechtman, E., and Irani, M. 2007. Space-time completion of video. IEEE Transactions on Pattern Analysis and Machine Intelligence 29 (Dec), 1-14.
"Singular value decomposition", Retrieved from <http:/_/en._wil<ipedia.org/wiki/Singularvalue_decomposition>on Nov. 29, 2010, (2010), 14 pages.
Avidan, et al., "Seam Carving for Content-Aware Image Resizing", *ACM Transactions on Graphics 2007*, (Jul. 2007), 9 pages.
Barnes, Connelly et al., "PatchMatch: A Randomized Correspondence Algorithm for Structural Image Editing", *ACM SIGGRAPH 2009 Papers* (New Orleans, Louisiana, Aug. 3-7, 2009), (Aug. 3, 2009), 11 pages.
Bhat, et al., "Using Photographs to Enhance Videos of a Static Scene", *Rendering Techniques 2007: 18th Eurographics Workshop on Rendering*, 327-338, (2007), 12 pages.
Brand, Matthew "Incremental singular value decomposition of uncertain data with missing values", *7th European Conference on Computer Vision (ECCV 2002)*, 707-720., (May 2002), 14 pages.
Buchanan, et al., "Damped Newton Algorithms for Matrix Factorization with MIssing Data", *IEEE Computer Society Conference on Computer Vision and Pattern Recognition*, 316-322, (2005), 7 pages.
Buehler, et al., "Non-Metric Image-Based Rendering for Video Stabilization", *2001 Conference on Computer Vision and Pattern Recognition (CVPR 2001 )*, 609-614., (2001), 6 pages.

(56) References Cited

OTHER PUBLICATIONS

Chen, et al., "Capturing Intention-based Full-Frame Video Stabilization", 2008, *Computer Graphics Forum 27*, 7, 1805-1814., (2008), 10 pages.

Chen, Pei "Optimization algorithms on subspaces: Revisiting missing data problem in low-rank matrix", 2008,*Int. J. Comput. Vision 80*, 1, 125-142., (2008), 40 pages.

Davison, et al., "MonoSLAM: Real-Time Single Camera SLAM", 2007, *IEEE Transactions on Pattern Analysis and Machine Intelligence 26*, 6, 1052-1067, (Jun. 2007), 16 pages.

Fitzgibbon, et al., "Image-Based Rendering Using Image-Based Priors", 2005, *International Journal of Computer Vision 63*, 2 (July), 141-151, (2005), 11 pages.

Gal, et al., "Feature-aware texturing", School of Computer Science, Tel Aviv University, Israel; Draft version. The original paper appeared in EGSR '06 proceedings., (2006), 7 pages.

Goh, et al., "Segmenting Motions of Different Types by Unsupervised Manifold Clustering", 2007, *IEEE Computer Vision and Pattern Recognition (CVPR)*, 1-6., (2007), 6 pages.

Igarashi, et al., "As-Rigid-As-Possible Shape Manipulation", *ACM Transactions on Graphics 2005*, (2005), 8 pages.

Irani, Michal "Multi-Frame Correspondence Estimation Using Subspace Constraints", 2002, *International Journal of Computer Vision 48*, 1, 39-51, (2002), 22 pages.

Lee, et al., "General Construction of Time-Domain Filters for Orientation Data", 2002, *IEEE Transactions on Visualization and Computer Graphics 8*, 2 (April-June), 119-128, (2002), 10 pages.

Lee, et al., "Video Stabilization using Robust Feature Trajectories", 2009, *IEEE ICCV.*, (2009), 8 pages.

Liu, et al., "Content-Preserving Warps for 3D Video Stabilization", 2009, *ACM Transactions on Graphics (Proceedings of SIGGRAPH 2009)* 28, 3 (Aug.), Article No. 44., (2009), 9 pages.

Matsushita, "Full-frame Video Stabilization", 2006, *IEEE Transactions on Pattern Analysis andMachine Intelligence 28*, 7, 1150-1163., (2006), 8 pages.

Morimoto, et al., "Evaluation of Image Stabilization Algorithms", 1997, *DARPA Image Understanding Workshop DARPA97*, 295-302., (1997), 4 Pages.

Nister, et al., "Visual Odometry", 2004, *IEEE Computer Vision and Pattern Recognition (CVPR)*, 652-659., (2004), 8 pages.

Shi, et al., "Good Features to Track", 1994, *IEEE Conference on Computer Vision and Pattern Recognition*, 593-600., (1994), 8 pages.

Sinha, et al., "GPU-based Video Feature Tracking and Matching", *Workshop on Edge Computing Using New Commodity Architectures (Edge 2006).*, (2006), 15 pages.

Tomasi, et al., "Shape and motion from image streams: A factorization method", 1992, *Int. J. Comput. Vision 9*, 2, 137-154., (1992), 8 pages.

Torr, et al., "The Problem of Degeneracy in Structure and Motion Recovery from Uncalibrated Image Sequences", 1999, *International Journal of Computer Vision 32*, 1, 27-44., (1999), 20 pages.

Vidal, et al., "Multiframe Motion Segementation with Missing Data Using PowerFactorization and GPCA", 2008, *Int. J. Comput. Vision 79*, 1, 85-105., (2008), 21 pages.

Zhang, et al., "Video stabilization based on a 3D perspective camera model", Zhang, G., Hua, W., Qin, X., Shao, Y., and Bao, H. 2009. *The Visual Computer 25*, 11, 997-1 008., (2009), 12 pages.

"Final Office Action", U.S. Appl. No. 12/953,703, Jan. 31, 2014, 11 pages.

Choi, et al.,' "Robust video stabilization to outlier motion using adaptive RANSAC", IEEE/RSJ International Conference on Intelligent Robots and Systems, Oct. 10, 2009, 6 pages.

"Non-Final Office Action", U.S. Appl. No. 12/953,703, (Jul. 15, 2013), 9 pages.

Tomasi, et al., "Shape and Motion form Image Streams under Orthography: a Factorization Method", *International Journal of Computer Vision*, 9:2, (Nov. 1992), pp. 137-154.

"Supplemental Notice of Allowance", U.S. Appl. No. 12/953,703, Oct. 6, 2014, 2 pages.

"Notice of Allowance", U.S. Appl. No. 12/953,703, Jun. 6, 2014, 9 pages.

\* cited by examiner

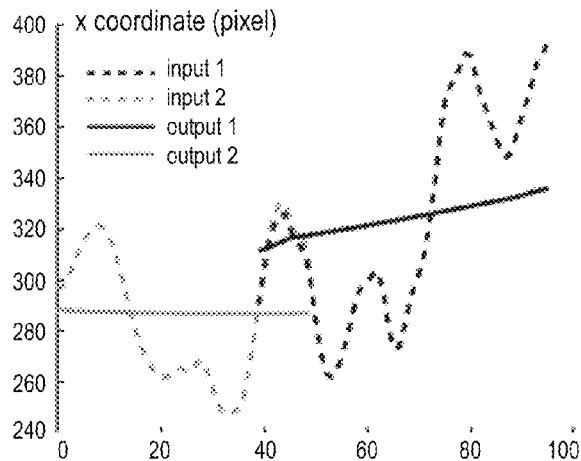 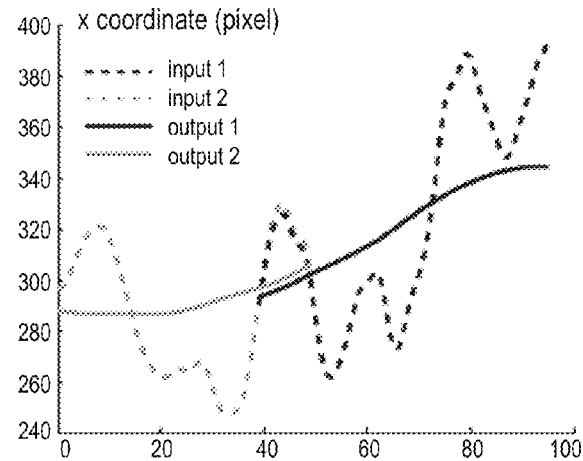
FIG. 3A  FIG. 3B
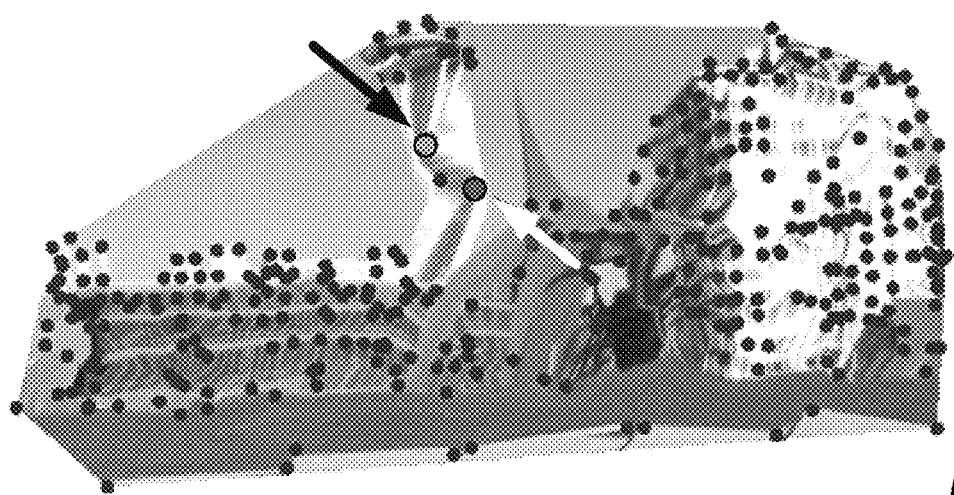
FIG. 3C
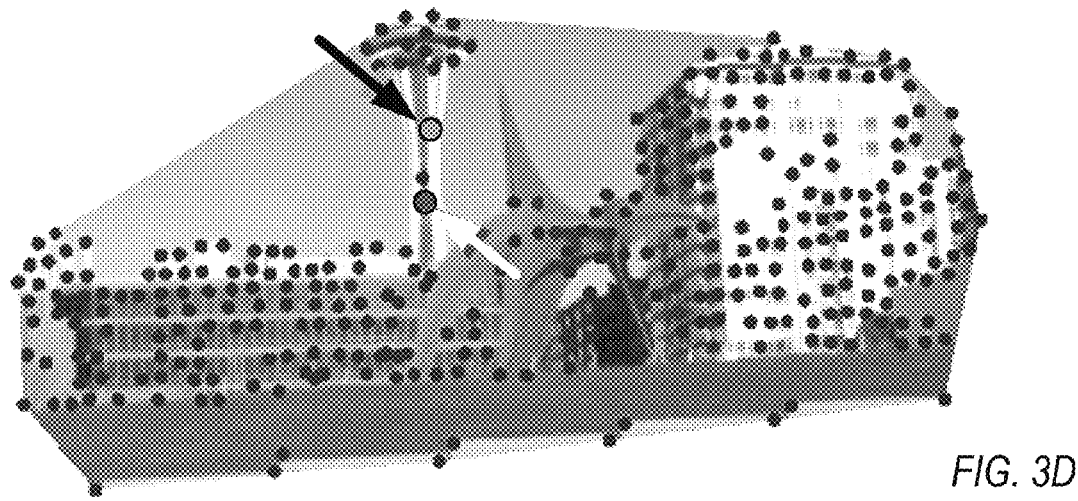
FIG. 3D

METHODS AND APPARATUS FOR VIDEO COMPLETION

PRIORITY INFORMATION

This application claims benefit of priority of U.S. Provisional Application Ser. No. 61/382,824 entitled "Methods and Apparatus for Video Completion" filed Sep. 14, 2010, the content of which is incorporated by reference herein in its entirety.

BACKGROUND

Description of the Related Art

Movie production studios often need to remove objects from videos. For example, a rig that was used in a shot or an unwanted object accidentally left in frame may need to be removed. However, conventional professional video object removal techniques tend to be difficult, slow and expensive. Conventional attempts to produce more commercially-suitable video object removal techniques, also referred to as video completion techniques, generally impose limitations on camera motion, only work on short video at very low resolution, and have long running time and high memory requirements.

Content-Preserving Warps

Content-preserving warps, or content-aware warps, have been introduced as a non-physically-realistic approach to rendering the appearance of new camera paths for dynamic scenes. A content-preserving warp is content-aware in that it attempts to maintain as much as possible the original characteristics of the objects in the scene that are most likely to be noticeable to a viewer. In this method, the reconstructed 3D point cloud is projected to both the input and output cameras, producing a sparse set of displacements that guide a spatially-varying warping technique.

Video Stabilization

One of the most obvious differences between professional and amateur level video is the quality of camera motion; hand-held amateur video is typically shaky and undirected, while professionals use careful planning and equipment such as dollies or steadicams to achieve directed motion. Such hardware is impractical for many situations, so video stabilization software is a widely used and important tool for improving casual video. While video stabilization techniques may help video sequences look more professional, these techniques generally require lowering the resolution of the final stabilized result—in other words, the video frames are cropped.

SUMMARY

Various embodiments of methods, apparatus, and computer-readable storage media for video completion are described. Embodiments of a video completion technique are described that work under general camera motion at speeds suitable for commercial use. The video completion technique, for example, enables a user to remove an object from a video and seamlessly fill in the resulting hole with the static background of the scene. Embodiments may leverage the observation that the background behind the area to fill in was seen in another frame.

In at least some embodiments, the video completion technique starts by predicting the location of static scene points in the area to fill. In at least some embodiments, the video completion technique applies a subspace constraint technique that finds and tracks feature points in the video. These subspace tracks are used to form a model of the camera motion, and are also used to predict the locations of background scene points in frames where the background is occluded. The technique may assume that the background is static. The video completion technique then finds another frame where those points were visible. Next, the technique warps the frame using those predicted points as a guide, and arrives at a candidate that can be used to at least partially fill the hole. In some embodiments, a content-preserving warp technique may be used. However, if there are large parallax effects, then the warped area may not align correctly with the region around the hole. Therefore, in at least some embodiments, the technique may apply image consistency constraints to modify the warp so that it fills the hole seamlessly. Finally, the video completion technique applies a compositing technique to composite the warped image into the hole. This process may be repeated as necessary until the hole is filled on all frames.

The video completion technique may also be used or adapted to fill in regions of video that get cropped as a result of video stabilization techniques. For example, embodiments of the video completion technique may be used in or with embodiments of a subspace video stabilization technique to restore the cropped border regions of stabilized videos output by the subspace video stabilization technique. Embodiments of the video completion technique may be applied to the video output of other video stabilization techniques as well. Furthermore, embodiments of the video completion technique may be applied to the video output of other video processing techniques that either crop edges of video frames or remove objects from video frames to restore missing content, for example holes or border regions, in the video sequences.

BRIEF DESCRIPTION OF THE DRAWINGS

FIGS. 3A through 3D illustrate subspace low-pass filtering, according to at least some embodiments.

Figure 1:
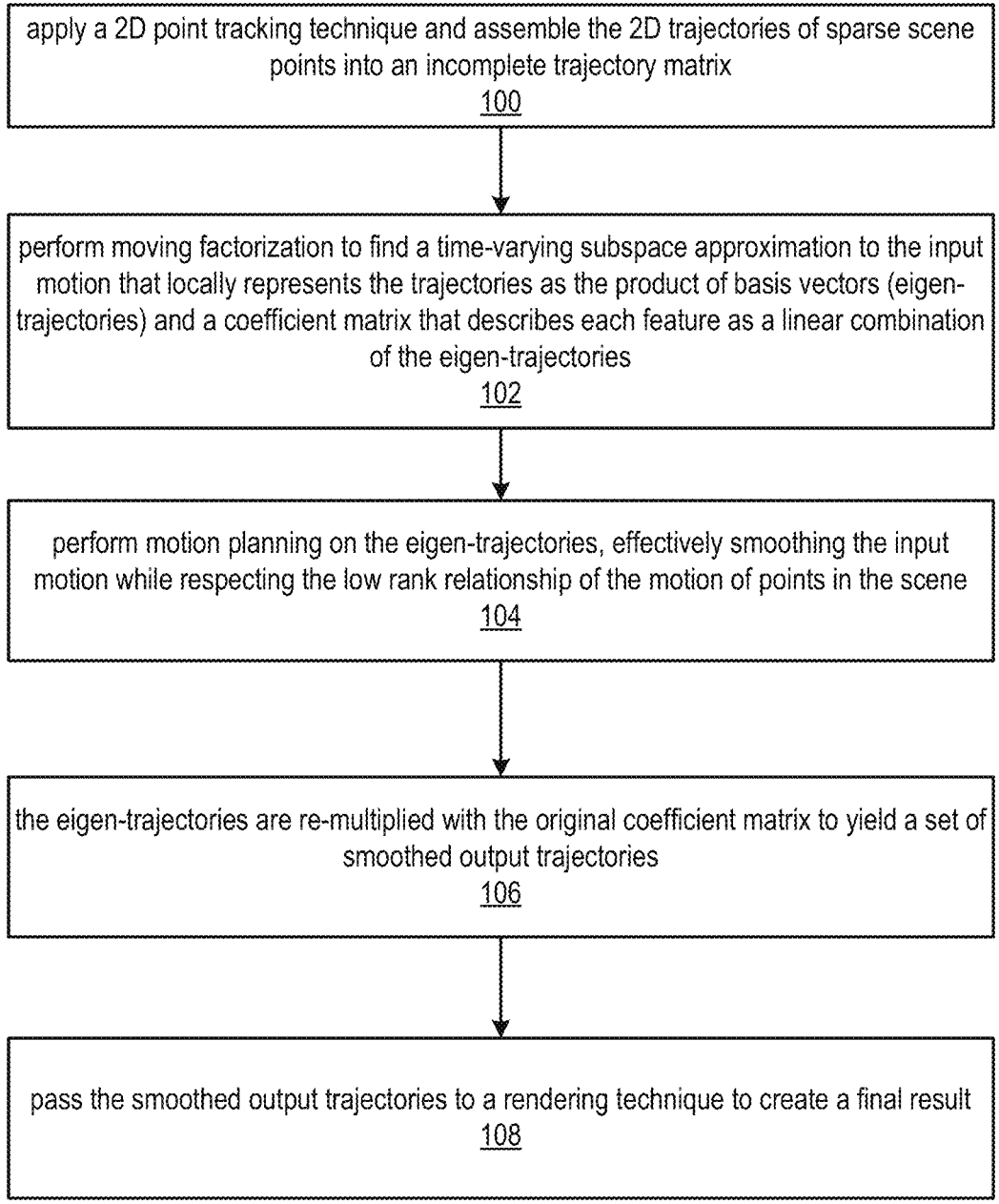
FIG. 1 is a flowchart of a subspace video stabilization technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for video completion are described. Embodiments of a video completion technique are described that work under general camera motion at speeds suitable for commercial use. The video completion technique, for example, enables a user to remove an object from a video and seamlessly fill in the resulting hole with the static background of the scene. Embodiments may leverage the observation that the background behind the area to fill in was seen in another frame.

The video completion technique may also be used or adapted to fill in regions of video that get cropped as a result of video stabilization techniques. For example, embodiments of the video completion technique may be used in or with embodiments of a subspace video stabilization technique as described herein to restore the cropped border regions of stabilized videos output by the subspace video stabilization technique. Embodiments of the video completion technique may be applied to the video output of other video stabilization techniques as well, and to the video output of other video processing techniques that either crop edges of video frames or remove objects from video frames, to restore missing content, for example holes or border regions, in the video sequences.

This document first describes embodiments of a subspace video stabilization technique, and then describes embodiments of the video completion technique that may, for example, be applied to restore missing content (border regions) in stabilized videos output by the subspace video stabilization technique.

Subspace Video Stabilization Technique

Various embodiments of methods, apparatus, and computer-readable storage media for subspace video stabilization are described. A technique for video stabilization is described that is robust and efficient, yet provides high quality results over a range of videos. When compared to conventional 3D video stabilization techniques employing structure from motion (SFM) technology, the video stabilization techniques described herein are relatively simple and may require no special handling of the above-noted problems in techniques employing SFM, since none of the problems change the subspace properties of motion trajectories on which embodiments of the technique rely. Furthermore, embodiments of the technique may be performed in real-time or near real-time, may use linear approximations to bilinear optimizations for efficiency, and may be computed in a streaming fashion.

Embodiments of a subspace video stabilization technique are described that can achieve aggressive, high-quality stabilizations on a wide range of videos in a robust and efficient way. Embodiments of the subspace video stabilization technique may achieve the appearance of smooth camera motions without creating 3D reconstructions, allowing embodiments to operate efficiently and to work in situations where reconstruction is challenging. Therefore, embodiments of the subspace video stabilization technique are suitable for use in consumer-level video processing tools, as well as more advanced or professional video processing tools. Embodiments of the subspace video stabilization technique are based on the observation that accurate scene reconstruction is not necessary if the goal is merely to improve the quality of video. For video processing applications, visually plausible results are sufficient. By aiming for this simpler goal, embodiments may implement methods that avoid solving challenging computer vision problems when performing video stabilization.

While several techniques are described herein as being applied to video stabilization, one or more of the techniques described herein may also be applied to other video processing tasks.

Embodiments may provide a robust and efficient approach to video stabilization that achieves high-quality camera motion for a wide range of videos. Embodiments of the subspace video stabilization technique may focus on transforming a set of input 2D motion trajectories so that they are both smooth and resemble visually plausible views of the imaged scene; a key insight employed in embodiments is that this goal may be achieved by enforcing subspace constraints on feature trajectories while smoothing them. At least some embodiments may assemble tracked features in the video into a trajectory matrix, factor the trajectory matrix into two low-rank matrices, and perform filtering or curve fitting in a low-dimensional linear space. In order to more efficiently process long videos, embodiments of the video stabilization technique may employ a moving factorization that is both efficient and streamable. Experimental results are provided that confirm that this approach can efficiently provide stabilization results comparable with conventional 3D video stabilization methods in cases where those methods succeed, but also provides smooth camera motions in cases where such conventional approaches often fail, such as videos that lack parallax. Embodiments may thus provide a video stabilization technique that both achieves high-quality video stabilization and that is practical enough for consumer applications.

Embodiments may thus implement a subspace video stabilization technique that combines the advantages of 2D and 3D video stabilization. Embodiments of the subspace video stabilization technique may achieve the strongly stabilized, high-quality appearance of 3D stabilization and the efficiency and robustness of 2D methods. Both 2D and 3D stabilization methods may be summarized by three steps: (1) track scene points; (2) compute where the tracked points should be located in the output to stabilize the video content; and (3) render an output video which both follows those point locations and looks natural.

The second step is a key challenge of stabilization: new, smooth motion trajectories that respect geometric relationships between points are needed, so that the motion trajectories appear as the motion of a plausible, non-distorted view of the scene. 2D reconstruction approaches enforce plausibility by limiting changes to 2D transformations, which is simple but too limiting. 3D reconstruction approaches reconstruct a 3D model of the scene and use the 3D model to enforce the validity of synthesized views. However, performing 3D reconstruction is error-prone and may be overkill for the stabilization problem.

An ideal constraint should restrict the smoothed motion trajectories to visually plausible solutions without being too restrictive, and should be efficient and robust to compute. A key insight is that such a constraint may be achieved by leveraging the fact that a matrix of motion trajectories of a rigid scene imaged by a moving camera over a short period of time should approximately lie in a low-dimensional subspace. Embodiments of the subspace video stabilization technique may incorporate and extend this insight by applying the constraint to a moving window over the length of a potentially long video; that is, embodiments efficiently compute a time-varying subspace through moving factorization. Via this technique, embodiments of the subspace video stabilization technique may achieve visual plausibility by performing motion smoothing in this time-varying subspace rather than directly on the original 2D trajectories. The result is that embodiments implement an approach to video stabilization that achieves the strongly stabilized, high-quality appearance of 3D video stabilization methods, with the efficiency, robustness, and generality of 2D video stabilization methods.

FIG. 1 is a flowchart of a subspace video stabilization technique, according to at least some embodiments. As indicated at 100, a 2D point tracking technique is applied, and the 2D trajectories of sparse scene points are assembled into an incomplete trajectory matrix. As indicated at 102, a moving factorization technique is performed to efficiently find a time-varying subspace approximation to the input motion that locally represents the trajectories as the product of basis vectors, referred to as eigen-trajectories, and a coefficient matrix that describes each feature as a linear combination of these eigen-trajectories. As indicated at 104, a motion planning (or smoothing) technique is applied to the eigen-trajectories, effectively smoothing the input motion while respecting the low rank relationship of the motion of points in the scene. As indicated at 106, the smoothed eigen-trajectories are combined (e.g., re-multiplied) with the original coefficient matrix to yield a set of smoothed output trajectories. As indicated at 108, the smoothed output trajectories may be passed to a rendering technique, such as a content-preserving warping technique, also referred to as a content-aware warp technique, to create a final result. The rendering technique may warp the input video sequence according to the smoothed output trajectories to produce an output, stabilized video sequence.

Embodiments of the subspace video stabilization technique may achieve the high quality stabilization results seen in 3D stabilization, without computing a 3D reconstruction. On videos where SFM performs well, results of the subspace video stabilization technique may be comparable to results of conventional methods. However, the subspace video stabilization technique is more efficient than these conventional methods, and allows for a streaming implementation. Furthermore, embodiments of the subspace video stabilization technique may handle a wide range of inputs including inputs that are challenging for conventional SFM, such as videos that lack parallax, and videos that exhibit camera zoom, in-camera stabilization, or rolling shutter artifacts.

At least some embodiments may employ a content-aware warping technique and/or one or more other techniques as described in U.S. patent application Ser. No. 12/276,119, entitled "Content-Aware Video Stabilization," filed Nov. 21, 2008, the content of which is incorporated by reference herein in its entirety.

The elements of the method illustrated in FIG. 1 will be further described below.

Subspace Video Stabilization

As illustrated at 100 of FIG. 1, embodiments of the subspace video stabilization technique may first compute a set of sparse 2D feature trajectories using a 2D point tracking technique, and assemble the 2D trajectories into an incomplete trajectory matrix. In at least some embodiments of the subspace video stabilization technique, Kanade-Lucas-Tomasi (KLT) feature tracker technology may be used as the 2D point tracking technique. In other embodiments, other feature tracking techniques may be used. Given a set of 2D point trajectories, video stabilization may be split in two problems: (1), where should those points be located in the output to stabilize the video content, and (2), how to render an output video which both follows those point locations and looks natural.

To more formally define the first problem, a set of N input feature trajectories is formed across F frames whose i-th trajectory is $\{(x_t^i, y_t^i)\}$, where $(x_t^i, y_t^i)$ are coordinates at frame t. These trajectories can be assembled into a trajectory matrix M:

$$M_{2N \times F} = \begin{bmatrix} x_1^1 & x_2^1 & \ldots & x_F^1 \\ y_1^1 & y_2^1 & \ldots & y_F^1 \\ & & \vdots & \\ x_1^N & x_2^N & \ldots & x_F^N \\ y_1^N & y_2^N & \ldots & y_F^N \end{bmatrix} \quad (1)$$

Figure 2:
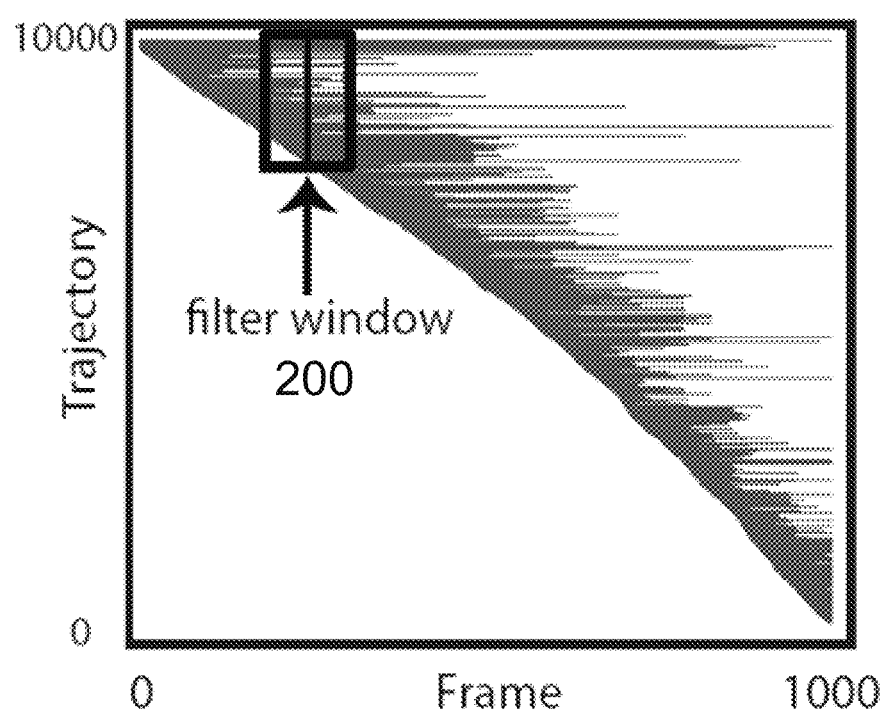
FIG. 2 illustrates a typical incomplete trajectory matrix, according to at least some embodiments.

Note that this matrix is highly incomplete, since trajectories will appear and disappear over the duration of the video. The occupancy of a typical trajectory matrix is illustrated in FIG. 2. FIG. 2 illustrates a typical incomplete trajectory matrix, with each tracked 2D point moving from left to right across the matrix. Note that there are many more trajectories than frames, and the y-axis is scaled to make the matrix appear roughly diagonal. Filter window 200 represents a typical low-pass filter kernel 200.

A task is to create a new matrix of trajectories $\hat{M}$ that guides the rendering of a new, stabilized video; this may be performed either by traditional full-frame warping or by content-preserving warps. This new matrix should both contain smooth trajectories and be consistent with the original 3D scene imaged by a moving camera. The latter property is hard to satisfy accurately without actually reconstructing the input geometry; however, visual plausibility may be achieved by preserving the low-rank property of apparent motion while the trajectories are smoothed. The following describes what happens if this property is not preserved, and then describes a technical approach using subspace constraints that may be used in at least some embodiments of the subspace video stabilization technique.

Simple Trajectory Filtering

An assumption is made that it is desired to create a new motion by low-pass filtering the original motion across time (canonical motion paths, such as lines or parabolas, are addressed later in this document). An assumption is also made that the scene is static. Non-static (moving) scene content is addressed later in this document. Large, strong smoothing kernels may be used to achieve the strongly stabilized look of 3D video stabilization. In at least some embodiments, a Gaussian low-pass filter may be used, with a standard deviation of $\sigma = w/\sqrt{2}$, where w is the radius (half the window size) of the filter in frames. Kernels with a radius of 20-200 frames for a 30 fps video may well describe a spectrum from spline-like motions (50) to almost linear motions (200), though the effect may depend on the smoothness of the input. A default filter radius that may be used is 50, which is much stronger than the filtering typically performed in conventional 2D stabilization. For example, a typical kernel radius that is used in conventional 2D stabilization is 6. Ideally, this smoothing would be performed on the recovered 3D camera motion, but since SFM is not being performed, this information is not available.

If the trajectory matrix is simply filtered directly, i.e., $\hat{M} = MK$ where K is a low-pass filter kernel, this would be the same as applying a low-pass filter to each trajectory individually via convolution. While such an approach does not explicitly constrain the relationships between points, the fact that the filter is linear and applied in the same way to all points implicitly preserves properties of the relationships between points. However, because the matrix M is not complete, the filtering operation is not linear—each point receives different treatment (based on its incompleteness), and therefore inter-point relationships are broken. The visual result of this naive approach is very poor; as shown in FIG. 3C, the geometry of the scene is clearly not respected.

FIGS. 3A through 3D illustrate subspace low-pass filtering, according to at least some embodiments. FIG. 3A is a graph illustrating that a low-pass filter on two input trajectories (dashed lines) creates very different outputs (solid lines) for two similar trajectories, since their durations (and thus filter supports) are different, leading to broken geometric relationships in the rendered output as shown in FIG. 3C, which illustrates filtering each trajectory independently. FIG. 3B is a graph illustrating that, if the trajectory matrix is completed using matrix factorization (not shown), the filter outputs are more similar, leading to a better rendered result as shown in FIG. 3D, which illustrates filtering the eigen-trajectories. Note that these renderings (FIGS. 3C and 3D) are created using a 2D triangulation of the points to make the differences more clear.

An intuitive way to understand why this result is so poor is to examine what happens to nearby feature trajectories with different durations near their temporal boundaries, as shown in FIGS. 3A-3D. Because these trajectories have different temporal support regions for the smoothing kernel, the strength of the smoothing can differ significantly for nearby features, thus distorting local geometry.

There may be a number of simple solutions to this problem. One solution may be to simply discard the beginning and end of each feature trajectory, so that the kernel domain is always fully supported. However, since large smoothing kernels are used, this solution may not be practical, as there are often not enough trajectories that are long enough to support the warping stage (this problem most often occurs during camera panning, since features can enter and leave the field of view quickly). Another solution may be to extend each feature trajectory in duration using some sort of extrapolation or prediction. However, results of standard extrapolation using a polynomial model tend to be very poor; since each trajectory is extrapolated independently, geometric relationships with nearby features are again not preserved.

The following describes how subspace constraints may be used in embodiments of the subspace video stabilization technique to perform this extrapolation in a fashion that better preserves relationships between feature trajectories.

Subspace Constraints 3D reconstruction may allow the expression of geometric relationships between features. However, 3D reconstruction produces much more information than is necessary. Embodiments of the subspace video stabilization technique do not need to know the depths of points in the scene, and only need constraints that allow embodiments to preserve visual plausibility. Computer vision results suggest such a possible constraint that is weaker than a full reconstruction. When a rigid 3D scene is imaged by a moving affine camera, the observed motion trajectories should reside in a low-dimensional subspace. Under this subspace constraint, the trajectory matrix can be factored into a product of a camera matrix, representing each frame, and a scene matrix, representing each tracked point. If the trajectory matrix is complete, this factorization process is linear, fast, and robust. For an incomplete matrix, factorization is a non-linear problem.

Unfortunately, for the more common case of perspective cameras, the rank constraint becomes more complicated. In general, motion trajectories from a perspective camera will lie on a non-linear manifold instead of a linear subspace. However, it is possible to approximate the manifold locally (over a short period of time) with a linear subspace. In particular, for instantaneous motions a trajectory matrix should have at most rank 9. In this discussion, it may be assumed that this property holds over a short window of frames that is at least as large as the temporal smoothing kernel. The accuracy of this assumption is evaluated in more detail in the section titled Factorization accuracy, but the approximation may be sufficient for the purpose of insuring plausible views for video stabilization.

Filtering with Subspace Constraints

The following describes a method for filtering the trajectory matrix while maintaining this low-rank constraint that may be used in at least some embodiments. Consider a small window of the first k frames of an input sequence. Over this range of k frames, assume that the non-linear manifold on which the motion data lie can be locally modeled with a linear subspace of rank r. A rank value r=9 may be used in some embodiments; r=9 may model the data well without over-fitting or under-fitting. This low-rank constraint implies that the sub-matrix of the first k frames may be factored into the product of two low-rank matrices:

$$M_{2n \times k} \approx W \square (C_{2n \times r} E_{r \times k}) \quad (2)$$

where W is a binary mask matrix with 0 indicating missing data and 1 indicating existing data; the symbol $\square$ indicates component-wise multiplication (a method for performing this factorization is described later). The r row vectors of E may be referred to as eigen-trajectories, in that they represent the basis vectors that can be linearly combined to form a 2D motion trajectory over this window of k frames. The coefficient matrix C represents each observed feature as such a linear combination.

This factorization provides a straightforward way to smooth the trajectory matrix while preserving its rank. Embodiments may first fill in the missing data, and then low-pass filter the complete matrix and drop the elements corresponding to the missing data. However, it is not necessary to first complete the missing data, as smoothing is a linear operation which can be represented as a matrix multiplication, and matrix multiplication is associative:

$$\hat{M} = W \square (CE)K = W \square C(EK) = W \square C\hat{E}, \quad (3)$$

where $\hat{E}=EK$. In other words, this is equivalent to first low-pass filtering the eigen-trajectories E to obtain $\hat{E}$, and then obtaining a new sub-matrix $\hat{M}_{2n \times k}$ by multiplying $\hat{E}$ with the original coefficient matrix C and dropping the elements corresponding to the missing data. The latter strategy may be used in at least some embodiments, as it is more efficient to low-pass filter the eigen-trajectories. Also, for non-linear smoothing operations such as canonical path fitting, operating directly on the eigen-trajectories allows embodiments to preserve the low-rank property whether or not the smoothing operation would do so if applied directly to the trajectories themselves.

The result of the above factorization is a set of eigen-trajectories that can take any partial trajectory through the first k frames and complete it to a full trajectory. A final step before smoothing is to extend this approach across the duration of the entire video. While the entire matrix M may not be well modeled with a low-rank subspace because the data lie on a non-linear manifold, it may be assumed that it is over a range of k frames. This property implies that for any range of k frames in the matrix in FIG. 2, a local factorization can be computed that well models the portion of the matrix over the k frames that has existing values. To support the low-pass filter, the factorization only needs to be able to extend each trajectory forwards and backwards in time by the radius of the smoothing kernel; thus, the factorization does not need to be accurate everywhere, but only locally near the original trajectory values (e.g., near the diagonal of FIG. 2). Given a factorization of the first k frames, embodiments may propagate it forwards in a fashion that is consistent with the existing factorization, and that explains the new data as well. In essence, embodiments of the subspace video stabilization technique may track a time-varying subspace. In at least some embodiments of the subspace video stabilization technique, this may be accomplished in a greedy, moving fashion using a moving factorization technique as described below.

Moving Factorization

As indicated at 102 of FIG. 1, embodiments of the subspace video stabilization technique may perform moving factorization to find a time-varying subspace approximation to the input motion that locally represents the trajectories as the product of basis vectors (eigen-trajectories) and a coefficient matrix that describes each feature as a linear combination of the eigen-trajectories. At least some embodiments may employ a moving factorization technique that may be customized to the video stabilization application and that is efficient, scalable, and streamable. In short, embodiments may perform factorization in a fixed window of k frames, and move that window forward frames at each step. In some embodiments, values k=50 and δ=5 may be used. However, other values for k and δ may be used in other embodiments.

Embodiments of the moving factorization technique may begin by factoring the first k frames. Fortunately, for this application there should be a reasonable number of complete trajectories that already span all k frames and that describe the subspace. Embodiments may therefore take these n complete feature trajectories and use them to assemble a sub-trajectory matrix $M_{2n \times k}^0$. $M^0$ is a complete matrix, and is a sub-matrix of M. Generally, n must be at least as large as r/2 to make the subspace constraint meaningful, and in practice n may be significantly larger than r/2. In the rare cases where n<2r, k may be reduced until there are a sufficient number of trajectories. Embodiments may then factor $M^0$ as follows:

$$M_{2n \times k}^0 = C_{2n \times r} E_{r \times k} \quad (4)$$

In some embodiments, the factorization may be calculated by truncating the output of a singular value decomposition (SVD) technique to the rows, columns, and values corresponding to the largest r singular values, and then distributing the square root of each singular value to the left and right matrices.

Figure 4:
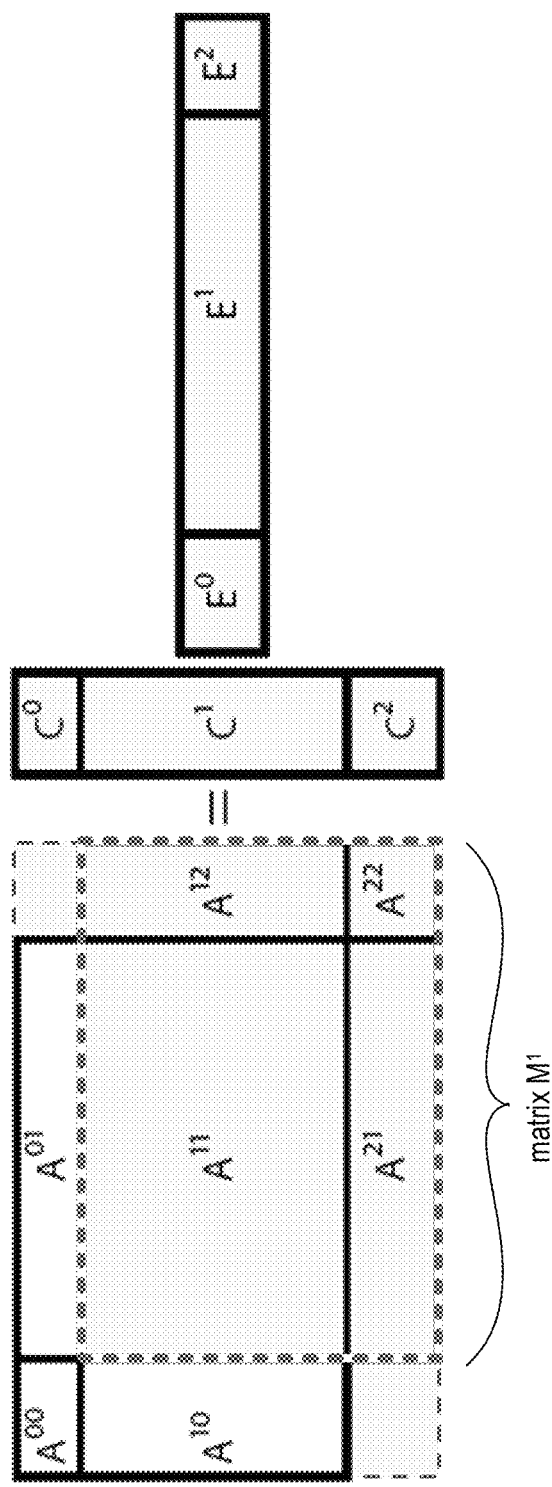
FIG. 4 illustrates moving matrix factorization, according to at least some embodiments.

Given a factorization of a window $M^0$, embodiments of the subspace video stabilization technique may compute the factorization $M^1$ of the next window (moved forward δ frames) in the same fashion. Since the factorization windows are highly overlapped, the corresponding trajectory matrices $M^0$ and $M^1$ are also highly overlapped. FIG. 4 illustrates moving matrix factorization, according to at least some embodiments. The factorization for an additional δ frames may be computed by keeping $C^0, C^1, E^0$, and $E^1$ fixed, and computing $C^2$ and $E^2$. The gray dashed rectangle indicates matrix $M^1$. As shown in FIG. 4, by matrix permutation, $M^0$ and $M^1$ can be re-organized as:

$$M^0 = \begin{bmatrix} A^{00} & A^{01} \\ A^{10} & A^{11} \end{bmatrix} \text{ and } M^1 = \begin{bmatrix} A^{11} & A^{12} \\ A^{21} & A^{22} \end{bmatrix}$$

respectively, where $A^{11}$ is shared between $M^0$ and $M^1$. Note that the factorization of $A^{11}=C^1E^1$ was already computed when $M^0$ was factored, so, in at least some embodiments, these values may be kept fixed, and $M^1$ may be processed as follows:

$$M^1 = \begin{bmatrix} A^{11} & A^{12} \\ A^{21} & A^{22} \end{bmatrix} = \begin{bmatrix} C^1 \\ C^2 \end{bmatrix} [E^1 \ E^2]. \quad (5)$$

To estimate $C^2$ and $E^2$ in a fashion that is both consistent with the already computed factorization (i.e., $C^1$ and $E^1$) and the new data (i.e., $A^{12}$, $A^{21}$, and $A^{22}$), in at least some embodiments, a least-squares technique may be applied by minimizing:

$$\min_{C^2, E^2} \|C^2 E^1 - A^{21}\|_F^2 + \|C^2 E^2 - A^{22}\|_F^2 + \|C^1 E^2 - A^{12}\|_F^2, \quad (6)$$

where $\|\cdot\|_F$ stands for the matrix Frobenius norm. Note that this is a bilinear optimization problem. However, to achieve an efficient solution, this may be solved approximately in a linear fashion, for example using a linear approximation technique. Since the factorization window moves forward a small number of frames per iteration, the size of $A^{22}$ may be significantly smaller than the size of $A^{21}$ and $A^{12}$. Therefore, in at least some embodiments, this problem may be solved by first estimating $C^2$ as the projection of $A^{21}$ onto $E^1$, $$C^2 = A^{21} E^{1T} (E^1 E^{1T})^{-1}, \quad (7)$$

and then solving for $E^2$ as follows:

$$E^2 = \left( \begin{bmatrix} C^1 \\ C^2 \end{bmatrix}^T \begin{bmatrix} C^1 \\ C^2 \end{bmatrix} \right)^{-1} \begin{bmatrix} C^1 \\ C^2 \end{bmatrix}^T \begin{bmatrix} A^{12} \\ A^{22} \end{bmatrix}. \quad (8)$$

This linear solution to the bilinear problem (equation 6) may be as or nearly as accurate as those obtained through conventional non-linear optimization techniques.

A final step in performing the moving factorization is to compute the coefficients for those trajectories that were too short to be included in matrix $M^1$. In at least some embodiments, the coefficients may be computed for any trajectory whose duration ends in the current factorization window and whose coefficients are not already computed by projecting it onto the eigen-trajectories, as in Equation 7.

Smooth Motion Planning

As indicated at 104 of FIG. 1, embodiments may perform motion planning on the eigen-trajectories, effectively smoothing the input motion while respecting the low rank relationship of the motion of points in the scene. Once the eigen-trajectories are computed using moving factorization, a final task before rendering is to smooth the eigen-trajectories to simulate smooth camera motion. Note that, unlike 3D video stabilization, there is no need to linearize the non-Euclidean space of camera orientations, since apparent motion is already represented with a linear approximation. This fact simplifies the motion planning compared to conventional techniques. Various embodiments may implement one or more of several techniques for motion planning, including but not limited simple low-pass filtering, automatic polynomial path fitting, and interactive spline fitting techniques, which are described below.

Low-Pass Filtering

A relatively simple approach to smooth camera motion that may be used in some embodiments is to run a low-pass filter over the eigen-trajectories. An advantage of this method is that it works for any length of video, and fits within a streaming framework where only a window of frames around the current frame need be accessible. Specifically, embodiments may only require access to a window of max(k, 2w) frames centered at the current frame, where k is the factorization window size and w is the radius of the smoothing kernel. A range of kernel sizes may be provided; however, in some embodiments, a default of w=50 may be provided. Embodiments may support much larger kernels than conventional 2D video stabilization techniques since the technique used in embodiments is not based on a 2D motion model, and can therefore account for parallax in the input.

Polynomial Path Fitting

Dramatic cinematographic effects may be created by moving a camera along a very simple path, such as a line or parabola. However, embodiments of the subspace video stabilization techniques may not achieve such motions exactly since embodiments do not know the 3D camera projection matrices. However, embodiments may achieve qualitatively similar results by fitting polynomial models to the eigen-trajectories. In at least some embodiments, three polynomial motion models may be supported: constant, linear, and quadratic. Other polynomial models may be supported in some embodiments. A polynomial motion model for the eigen-trajectories that may be used in some embodiments may be represented as:

$$\hat{E}_t = \sum_{j=0}^{d} K_j t^j,$$

where $\hat{E}_t$ is a vector containing the values of the new eigen-trajectories at frame t, d is the degree of the polynomial, and each $K_j$ is an unknown r-element vector that is the coefficient for the polynomial term. Degree-d polynomial eigen-trajectories lead to degree-d polynomial feature trajectories:

$$(x_t^i, y_t^i) = (C_{2i} \Sigma_{j=0}^{d} K_j t^j, C_{2i+1} \Sigma_{j=0}^{d} K_j t^j).$$

Embodiments may compute the $K_j$ coefficients of this polynomial model for the output eigen-trajectories as the best polynomial approximation of the input eigen-trajectories. Specifically, the displacement between the new position and the original position of every feature point may be minimized:

$$\min_{\hat{E}} \|W \Box (C\hat{E} - CE)\|_F^2 \quad (9)$$

The optimal polynomial eigen-trajectories may be computed by solving the above linear system. Note that the result of this process creates a 2D polynomial path for each output trajectory, which is different than fitting a 3D polynomial to the camera's motion; however, the visual result tends to be similar. Also note that this approach to planning camera motion may require access to the whole video, and may not be computable in a streaming fashion.

Interactive Spline Fitting

Polynomial path fitting may not be appropriate for long videos, since their motion cannot be well modeled with a single polynomial. In these cases, at least some embodiments may provide an interface that allows the user to select several keyframes. A standard spline may then be fit to the eigen-trajectories with knots at the keyframes. In some embodiments, the user can choose between quadratic and cubic splines. Since the feature trajectories are linear combinations of the eigen-trajectories, a quadratic (or cubic) spline for the eigen-trajectories leads to a quadratic (or cubic) spline for each output feature trajectory. However, this motion planning approach may not be computable in a streaming fashion.

Dynamic Scene Content

The low-rank constraints of which embodiments may take advantage may not hold for moving objects in the scene, that is to objects that are moving relative to the background of the scene. Therefore, in at least some embodiments, as many of these outlier trajectories as possible may be removed before performing factorization and content-preserving warps (a small number of remaining outliers can be treated by the factorization algorithm as noise). Various embodiments may remove such outlier trajectories using one or more strategies. Three example strategies that may be used are described below.

A first example strategy that may be used to remove outlier trajectories is based on the observation that trajectories on moving objects are typically much shorter than those on rigid objects. Therefore, in some embodiments, trajectories shorter than a threshold (e.g., 20 frames) may be removed entirely. In addition, trajectories shorter than k frames do not influence the eigen-trajectories, since factorization is only computed on trajectories that are complete over the window.

A second example strategy that may be used to remove outlier trajectories in some embodiments is to rule out motion outliers using a fundamental matrix constraint. Some embodiments may, for example, estimate a fundamental matrix between every five frames within a RANSAC loop, and remove a trajectory when it deviates from the epipolar constraint by more than one pixel for more than ⅓ of the duration that the algorithm has processed.

A third example strategy that may be used to remove outlier trajectories in some embodiments is to remove trajectories with a large factorization error after factorization is computed. A large factorization error may, for example, be classified as any trajectory whose per-frame error ever exceeds three pixels. Some embodiments may re-compute factorization after removing these outlier trajectories; however, the improvement in results may not be worth the computational expense, and therefore this re-computation may not be performed in other embodiments.

Experimental Validations of the Subspace Video Stabilization Methods

Two numerical experiments are described that experimentally validate two properties of the subspace video stabilization technique described above: the accuracy of the factorization scheme, and robustness to rolling shutter artifacts.

Factorization Accuracy

The incremental factorization approach that may be used in embodiments is an approximation in several ways. First, an assumption is made that motion trajectories over k frames can be described with a low-rank subspace; however, this is only approximately true. Second, the factorization approach is greedy, starting from the first k frames and moving forward using a linear approximation to the bilinear fitting; some sort of non-linear optimization may yield more accurate results.

The error of this factorization approach has been evaluated by computing the mean factorization error, i.e., the difference between the original trajectory and the same trajectory reconstructed from the subspace. Note that this error is computed before removing any large error outlier trajectories, as described in the section titled Dynamic scene content. For a diverse sample set of 70 videos resized to a resolution of 640×360, the mean error per video ranged from 0.08 to 0.26 pixels. Next, experiments were performed with several iterative global optimization techniques such as the damped Newton technique and Levenberg-Marquardt technique. It was found that these methods significantly reduced the factorization error (by a factor of 4, on average), at the expense of much longer computation times. However, this reduction in error did not significantly improve the visual quality of the results, perhaps because the error is already sub-pixel. It is also worth noting that embodiments of the subspace video stabilization technique may not need as precise a factorization as some other conventional applications, just one that leads to visual plausibility. Therefore, embodiments may use the efficient, streamable approach as described herein to obtain satisfactory results with less computation time than would be required by non-linear techniques.

Rolling Shutter Video

Many if not most consumer-level video cameras have CMOS sensors that can only be read-out in a sequential fashion from top to bottom. The result is that a video frame does not record a snapshot of time; instead, time varies across the frame, resulting in aliasing that can be seen as skewing or wobbling of objects in the video. This property of video poses serious challenges for both SFM and conventional 2D video stabilization.

In practice, it is found that embodiments of the subspace video stabilization technique as described herein works well on rolling shutter videos. While strong theoretical arguments are not provided as to why rolling shutter videos preserve the subspace constraint, it is possible that the artifacts appear as structured noise to the subspace video stabilization technique, which tends to be robust to noise. However, to confirm the performance of the subspace video stabilization technique on rolling shutter videos, an experiment was constructed and performed. In the experiment, a rolling shutter effect was approximately simulated for 30 videos shot with a 3-CCD camera (and thus free of rolling shutter). Then, factorization error was compared before and after the rolling shutter effect was added.

For the, experiments, rolling shutter was modeled by shifting each track according to its scanline. That is, for each feature trajectory at frame t its new position, $\tilde{p}_t = (x_t, y_t)$, was calculated by shifting the feature trajectory in time by $\lambda$ and interpolating its position at consecutive frames:

$$\tilde{p}_t = (1-\lambda)p_t + \lambda p_{t+1}, \quad (10)$$

where $p_t$ and $p_{t+1}$ are its position at time t and t+1, respectively. These two coordinates are obtained from the tracking results of the non-rolling shutter video, and $\lambda$ is the shift in time. The value of $\lambda$ depends on the camera and vertical coordinate, i.e., $\lambda = \kappa(y_t/H)$, where H is the height of the video frame. The parameter $\kappa$ depends on the amount of rolling shutter introduced by the camera, and is typically less than 1. In the experiments, $\kappa$ is set at 1, which might exaggerate the rolling shutter effect.

Factorization was then performed on the original trajectory matrix and the simulated rolling shutter matrix. Only the first 100 frames of each sequence were considered, and only trajectories that spanned that entire duration were used, thus yielding a complete matrix that can be factorized using a singular value decomposition (SVD) technique. It was found that the mean factorization errors for these rolling shutter matrices are reasonably close to the original matrices: on average, the rolling shutter effect increases the factorization error by 13.5%. Note that rolling shutter may also negatively impact 2D tracking, since it introduces local distortion, and the experiments do not measure this impact.

These empirical experiments show that the effect of rolling shutter on the subspace constraint is relatively minor and can be treated as structured noise. Another 40 videos were taken using a rolling shutter camera, and the incremental factorization approach was performed on these videos. The mean reconstruction error for these rolling shutter videos was 0.165 pixels, compared to the 0.135 error of non-rolling shutter videos. Thus, in general, the subspace video stabilization technique produces visually good results for rolling shutter sequences.

Experimental Results of the Subspace Video Stabilization Methods

An embodiment of the subspace video stabilization technique as described herein has been tested on 109 video sequences, ranging from 5 to 180 seconds in length, captured by a variety of people and cameras in many different scenes. Of these videos, 48 were captured with a 3-CCD camera without a rolling shutter, and 61 were captured with a CMOS HD camera with a rolling shutter. The results of the subspace video stabilization technique were also compared to a conventional 3D stabilization technique and to conventional 2D stabilization features available in commercial technologies.

A first set of experiments evaluates the subspace video stabilization technique on a test set of 32 videos to demonstrate 3D video stabilization. Note that these sequences were specifically chosen to be friendly to structure-from-motion (SFM) techniques: they were shot by a constantly walking person to provide sufficient parallax, and exhibit no zooming or in-camera stabilization in order to keep the internal parameters of the camera fixed. It was found that the subspace video stabilization technique produced qualitatively similar results to those of conventional techniques for 25 of these videos, and better results for 7 of these videos. Two results are considered as similar if the camera stability and the degree of artifacts are similar, even if the exact motions and field of view of the results are slightly different.

Next, the subspace video stabilization technique was applied to 15 new videos captured with camera motions known to challenge SFM. A camera tracker was used that implements SFM, and the output of the SFM tracker failed since it produced a clearly incorrect reconstruction. The types of camera motions that are found to be challenging for SFM may include, but are not limited to: sequences that include periods of both walking, and panning while standing still; sequences with significant rolling shutter; sequences with in-camera stabilization left on; and sequences with changing focal length.

Note that other SFM implementations may perform better or worse than the one tested, but all of the above are well-known problems for SFM.

Of particular interest is how the subspace video stabilization technique as described herein works on rolling shutter videos since more and more new video cameras exhibit this artifact. Out of 61 example rolling shutter videos, it was found that 46 results of the subspace video stabilization technique were completely successful, 12 were moderately successful, and 3 were not successful. A result is considered moderately successful if it suffers from slight artifacts, like bouncing or wobbling locally, but is clearly preferable to the input. Rolling shutter is particularly challenging for 2D stabilization, since full-frame warps cannot remove the local wobbling it introduces. Two conventional 2D stabilization features available in commercial technologies (the second of which has a special feature designed for handling rolling shutter) were also applied to the example videos. It was found that the subspace video stabilization technique performs significantly better than the first conventional 2D stabilization technique for 47 out of 61 videos, and moderately better than the first technique for 11 out of 61 videos. The subspace video stabilization technique performs significantly better than the second conventional 2D stabilization technique for 42 out of 61 videos, and moderately better than the second technique for 16 out of 61 videos. The results are considered significantly better than those produced by the conventional 2D stabilization techniques when the results of the conventional techniques suffer from obvious high-frequency vibration, while results of the subspace video stabilization technique do not.

For the remaining 3 out of the 61 videos, the subspace video stabilization technique fails entirely since the videos are heavily dominated by scene motion. However, for these 3 videos, both conventional 2D stabilization techniques produce results that are visually worse than the input.

Finally, several additional challenging scenes were tested. These include a very long video, and a video with large amounts of scene motion. Overall, of the 109 videos that were used to test the subspace video stabilization technique, 86 are considered as completely successful, 20 as moderately successful because they exhibit moderate bouncing or other small artifacts, and 3 as failures.

Example Implementations of the Subspace Video Stabilization Technique

Figure 5:
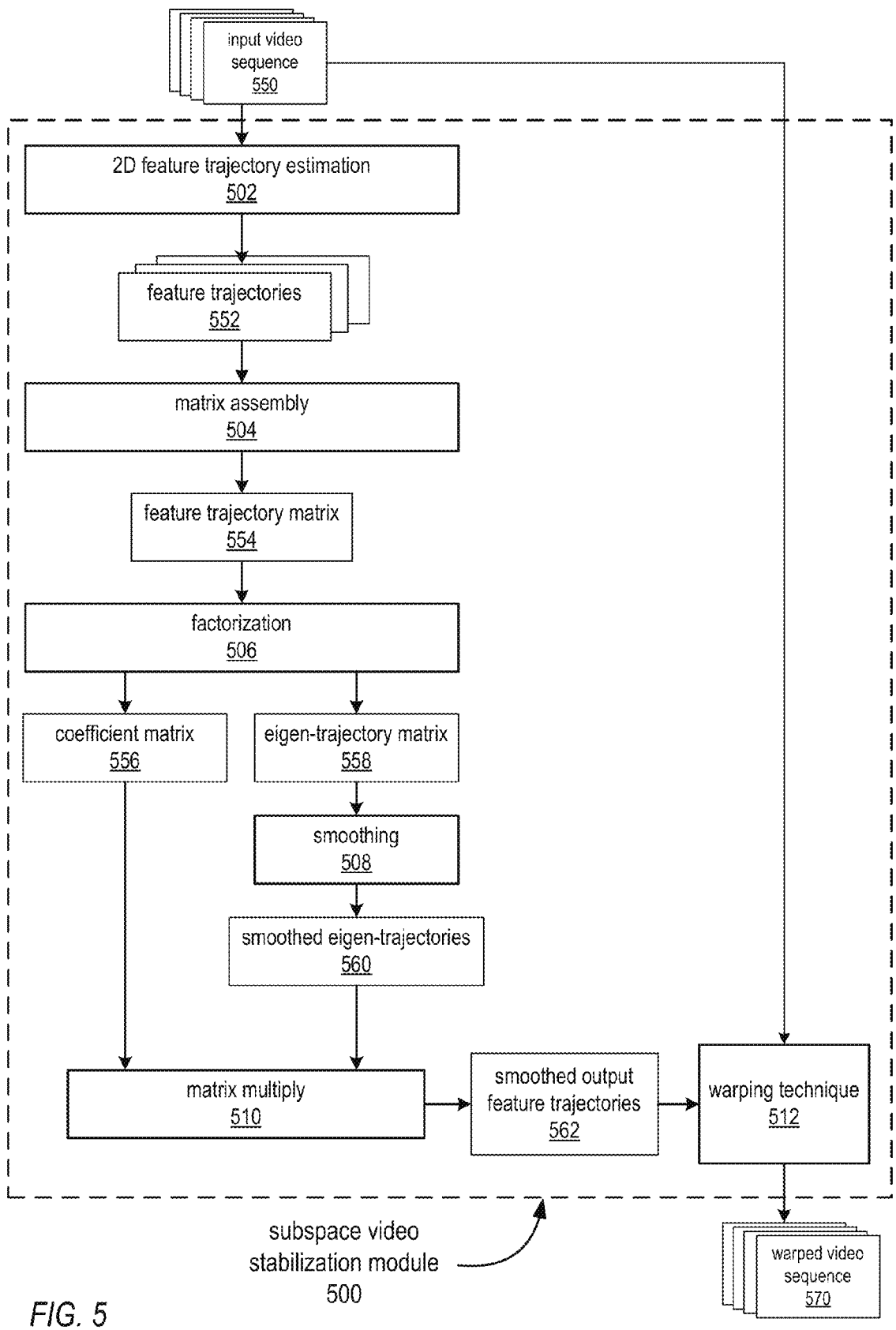
FIG. 5 illustrates an example subspace video stabilization module, and data flow and processing within the module, according to at least some embodiments.
Figure 6:
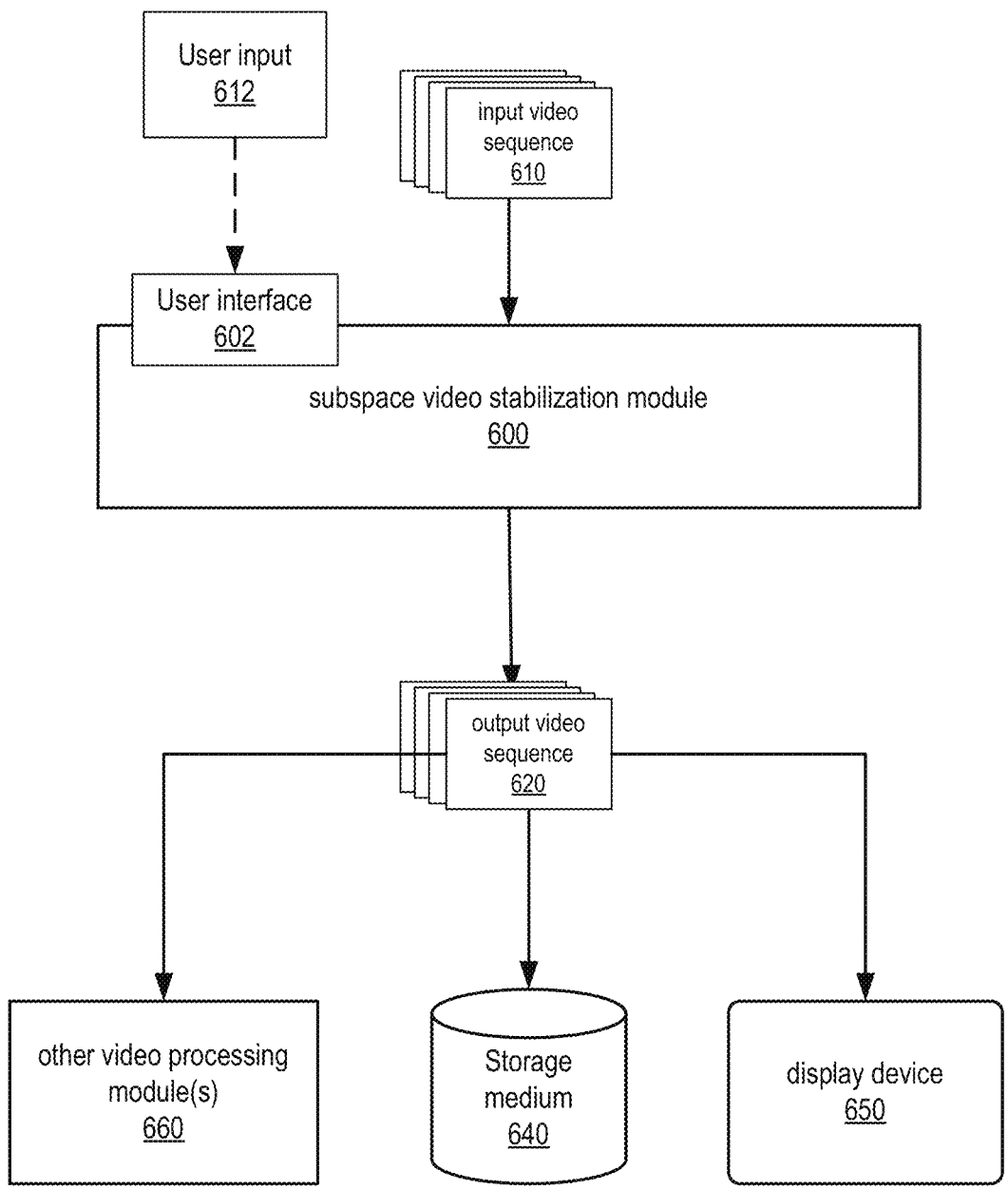
FIG. 6 illustrates a module that may implement subspace video stabilization methods as illustrated in FIGS. 1 through 5, according to at least some embodiments.
Figure 14:
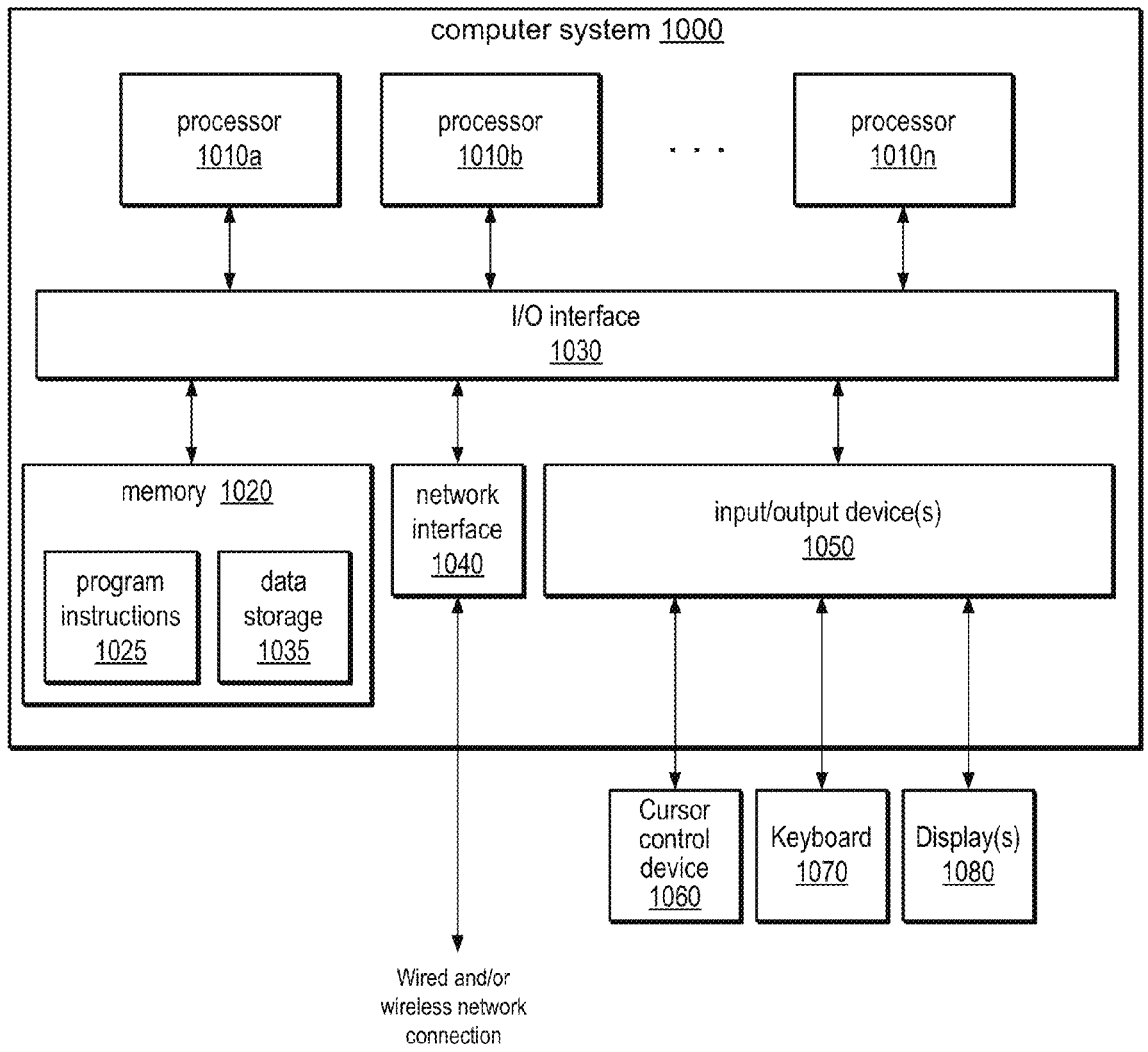
FIG. 14 illustrates an example computer system that may be used in embodiments.

Embodiments of the subspace video stabilization methods as described herein may be implemented in software, hardware, or a combination thereof. For example, embodiments of the subspace video stabilization methods may be performed by a subspace video stabilization module implemented by program instructions stored in a computer-readable storage medium and executable by one or more processors (e.g., one or more CPUs or GPUs). Embodiments of a subspace video stabilization module may, for example, be implemented as a stand-alone application, as a module of an application, as a plug-in for applications including image or video processing applications, and/or as a library function or functions that may be called by other applications such as image processing or video processing applications. Embodiments of the subspace video stabilization module may be implemented in any image or video processing application, or more generally in any application in which video sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example subspace video stabilization module that may implement the subspace video stabilization methods as described herein is illustrated in FIGS. 5 and 6. An example computer system on which a subspace video stabilization module may be implemented is illustrated in FIG. 14.

In addition to computer system implementations, embodiments of the subspace video stabilization methods as described herein may be implemented in other devices, for example in digital video cameras for video stabilization in captured video sequences, as a software module, hardware module, or a combination thereof.

FIG. 5 illustrates an example subspace video stabilization module 500, and data flow and processing within the module 500, according to at least some embodiments. FIG. 14 illustrates an example computer system on which embodiments of module 500 may be implemented. An input vide sequence 550 may be obtained. At 502, 2D feature trajectories 552 may be estimated from the input video 550. At 504, a feature trajectory matrix 554 may be assembled from feature trajectories 552. At 506, the feature trajectory matrix 554 may be factored, for example using a moving factorization technique as described herein, into two low-rank matrices: a coefficient matrix 556 representing the features, and an eigen-trajectory matrix 558 representing camera motion over time. The coefficient matrix 556 describes each feature as a linear combination of the eigen-trajectories 558. At 508, the eigen-trajectories 558 may be smoothed to generate smoothed eigen-trajectories 560. In at least some embodiments, a motion planning technique as described herein may be used in smoothing 508. At 510, smooth output feature trajectories 562 may be obtained by combining smoothed eigen-trajectories 560 with the original coefficient matrix 556. For example, smoothed eigen-trajectories 560 may be multiplied with the original coefficient matrix 556. At 512, the input video sequence 550 may be warped with the guidance of the new feature trajectories 562 to generate as output a warped, stabilized video sequence 570. In at least some embodiments, a content-preserving warp technique may be used as the warping technique 512.

While FIG. 5 shows the warping technique 512 as part of subspace video stabilization module 500, in some embodiments the warping technique 512 may be implemented external to module 500, for example as a separate video image frame warping module that accepts feature trajectories 564 and input video sequence 550 as input.

FIG. 6 illustrates an example subspace video stabilization module that may implement the subspace video stabilization methods as illustrated in FIGS. 1 through 5. FIG. 14 illustrates an example computer system on which embodiments of module 600 may be implemented. Module 600 receives as input a video sequence 610. In some embodiments, module 600 may receive user input 612 via user interface 602 specifying one or more video stabilization parameters as previously described, for example to select one or more keyframes to be used in the video stabilization technique. Module 600 then applies a subspace video stabilization technique as described herein, according to user input 612 received via user interface 602, if any. Module 600 generates as output a stabilized output video sequence 620. Output video sequence 620 may, for example, be stored to a storage medium 640, such as system memory, a disk drive, DVD, CD, etc. Output video sequence 620 may, in addition or instead, be displayed to a display device 650. Output video sequence 620 may, in addition or instead, be provided to one or more other video processing modules 660 for further processing.

Video Completion Technique

Figure 7:
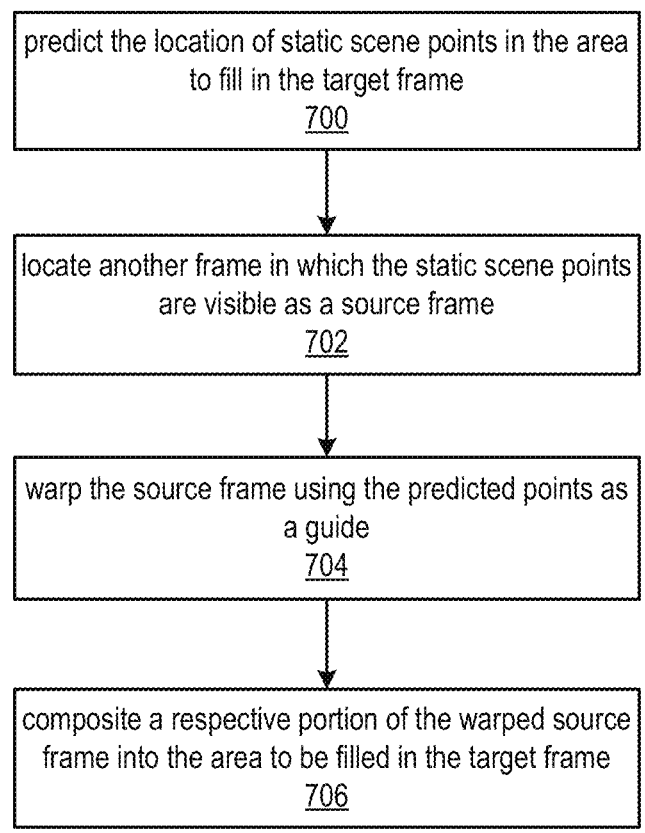
FIG. 7 is a flowchart illustrating a general technique for video completion, according to at least some embodiments.

Various embodiments of methods, apparatus, and computer-readable storage media for video completion are described. Embodiments of a video completion technique are described that work under general camera motion at speeds suitable for commercial use. The video completion technique, for example, enables a user to remove an object from a video and seamlessly fill in the resulting hole or region with the static background of the scene. Embodiments may leverage the observation that the background behind the area to fill in was seen in another frame. FIG. 7 is a flowchart illustrating a general technique for video completion, according to at least some embodiments. As indicated at 700, in at least some embodiments, the video completion technique starts by predicting the location of static scene points in the area to fill (e.g., hole) in the target frame across one or more other frames. In at least some embodiments, to predict the location of static scene points, the video completion technique may apply a subspace constraint technique that finds and tracks feature points in the input video sequence to generate feature tracks, factors the feature tracks into a low-dimensional subspace, and generates a prediction of background scene motion according to the low-dimensional subspace. As indicated at 702, the technique then locates another frame where the static scene points are visible to be used as a source frame. As indicated at 704, the technique warps the source frame using those predicted points as a guide, and thus arrives at a candidate region that can be used to at least partially fill the hole in the target frame. In at least some embodiments, a content-preserving warp technique may be used to warp the source frame. However, if there are large parallax effects, then the warped area in the source frame may not align correctly with the region around the hole in the target frame. Therefore, in at least some embodiments, the video completion technique may apply image consistency constraints to modify the warp so that the source frame region fills the hole in the target frame seamlessly. As indicated at 706, the video completion technique composites a respective portion of the warped source frame into the area to be filled in the target frame. This process may be repeated as necessary to fill the hole resulting from the removal of the object in two or more target frames. In addition to filling holes in video frames resulting from the removal of an object from the frames, embodiments of the video completion technique may also be applied to effectively uncrop stabilized video, for example stabilized video output by the subspace video stabilization technique as described herein, thus producing stabilized video with no loss of resolution.

Embodiments may thus provide a method for video completion, a more general problem than object removal, which works for general camera motion. In at least some embodiments, the video completion technique finds and tracks feature points in the video. These tracks are used to form a model of the camera motion, and are also used to predict the locations of background scene points in frames where the background is occluded. The technique may assume that the background is static. For hole filling due to object removal, the user gives as input a mask that covers the area to fill in for each frame. In the case of object removal, this may be just a rough mask around the object to remove. That area will be referred to as the hole. In some embodiments, the video completion technique may process each frame individually, filling the hole completely, and then processing the next frame. The frame being processed may be referred to as the target frame. In at least some embodiments, to fill the hole, the video completion technique considers candidate source frames where the background is visible. The technique then warps the source frame to align it with the target frame around the hole in the target. Given this alignment, embodiments may composite the source frame into the target frame to fill the hole. If the hole in the target frame is not completely filled, this process may be repeated with different source frames until the hole is filled. This process may be applied to every frame of the video until every frame of the video that requires filling is filled.

While an application for the video completion technique is in removing objects or blemishes from video sequences, and that application is generally described herein, the video completion technique may also be used or adapted to fill in regions of video that get cropped as a result of video stabilization techniques. While a video stabilization technique helps make video look more professional, applying a video stabilization technique to a video sequence often requires lowering the resolution of the final stabilized result, which results in border regions being cropped. Thus, techniques may be required to fill in or restore regions around the cropped frame to produce stabilized video at the original resolution. However, conventional techniques for such cropped region filling exhibit similar shortcomings to those described for conventional hole-filling techniques. Embodiments of the video completion technique as described herein may thus be applied to stabilized videos generated by video stabilization techniques to fill in or replace cropped edges. For example, embodiments of the video completion technique may be used in or with embodiments of the subspace video stabilization technique as previously described to restore the cropped border regions of stabilized videos output by the subspace video stabilization technique. Embodiments of the video completion technique may be applied to the video output of other video stabilization techniques as well. More generally, embodiments of the video completion technique may be applied to the video output of any video processing technique that crops edges of video frames, removes objects from video frames, or otherwise removes content from video frames to restore missing content, for example holes or border regions, in the video sequences.

Embodiments of the video completion technique may rely on a prediction of the background scene movement. This could be achieved using a structure from motion (SFM) technique, but for better performance embodiments may instead employ a subspace constraint technique similar to that described above in reference to the subspace video stabilization technique. Embodiments of the video completion technique may use the fact that motion trajectories for a static scene lie in a low dimensional subspace. Thus, embodiments may use this fact to predict the positions of static scene points that are occluded. These predicted points may then be used to guide the completion task.

Embodiments of the video completion technique may warp a frame to the viewpoint of another frame when filling holes (or cropped regions from stabilized video frames). However, this may be a difficult task since embodiments make no assumptions about the camera motion and do not have 3D geometry. In at least some embodiments, to perform the warp, a content-preserving warp technique, also referred to as a content-aware warp technique, may be employed. At least some embodiments may employ a content-aware warping technique and/or one or more other techniques as described in U.S. patent application Ser. No. 12/276,119, entitled "Content-Aware Video Stabilization," filed Nov. 21, 2008, the content of which is incorporated by reference herein in its entirety.

The content-preserving warp technique applies a homography to get a rough approximation of the overall warp. The content-preserving warp technique then uses known trajectories to guide a deformation of a mesh. Even though the results of such a warp may not be physically accurate, the results are generally visually plausible.

When there are large parallax effects, the warp may sometimes produce results with large discontinuity artifacts. Thus, in at least some embodiments, the video completion technique may use an image consistency energy term to help guide the warp so that the warped region aligns with the content around the hole being filled.

For the final composite, simply copying pixels from the warped source frame to fill the hole may create noticeable seams. Several techniques for reducing the visible seam while maintaining temporal coherence and not adding considerable runtime may be employed in various embodiments. For example, a technique for transitioning between images such as a blending flaps, cross fade, or linear ramp technique may be used in some embodiments. As another example, if there are lighting changes in the composited region, some embodiments may use a gradient domain blending technique or a technique that is a combination of gradient domain blending and graph cuts. Other techniques may be used for the final composite.

Video Completion Method

For simplicity, this discussion first focuses on the application of the video completion technique to object removal. Other applications of the video completion technique, and modifications to the technique that may be necessary for those applications, are subsequently discussed. However, the general, high-level method described herein would be similar or the same for the other applications.

Figure 8:
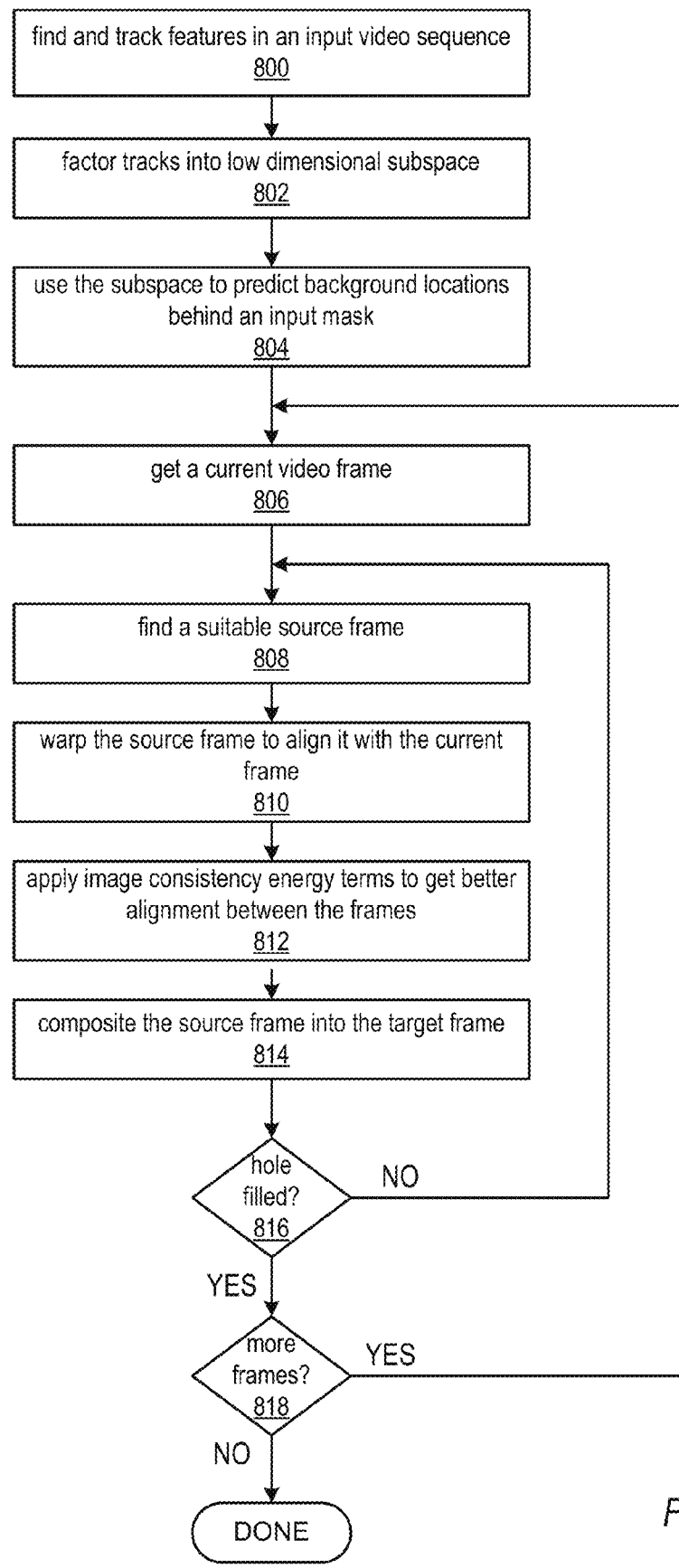
FIG. 8 is a flowchart of a video completion method, according to at least some embodiments.

FIG. 8 is a flowchart of a video completion method, according to at least some embodiments. The method for video completion may generate realistic results for general camera motion. In addition the method may be sufficiently fast to allow for consumer use, and may benefit filmmakers from the high end to amateurs. As input, the video completion method may receive an input video sequence and a mask (e.g., a user-specified mask) that indicates an object to be removed from the video sequence. (The mask may be specific to a particular frame of the sequence). As indicated at 800, the method may find and track features in the video sequence. As indicated at 802, the method may factor the feature tracks into low-dimensional subspace. As indicated at 804, the method may use this subspace to predict background locations of the feature tracks behind the mask (i.e., in the "hole"). Elements 806 through 816 may be repeated for every frame in the video sequence to fill in the hole in that frame. As indicated at 806, a current frame may be obtained from the video sequence. Elements 808 through 814 may be repeated for the current frame until the hole in the current frame is filled. As indicated at 808, a suitable source frame in the video sequence may be found (that is, another frame that has content that may be used to at least partially fill the current hole in the current frame). As indicated at 810, the method may warp the source frame to align it with the current frame. In at least some embodiments, a homography and content-preserving warp, for example as described in as described in U.S. patent application Ser. No. 12/276,119, entitled "Content-Aware Video Stabilization," filed Nov. 21, 2008, may be applied to the source frame to align it with the current frame. As indicated at 812, image consistency energy terms may be applied to get better alignment between the frames. As indicated at 814, the source frame may be composited into the target (current) frame to at least partially fill the hole in the current frame. At 816, if the hole is not completely filled, the method returns to 808 to get another source frame. At 816, if the hole is filled, the method goes to 818. At 818, if there are more frames in the video sequence to be processed, then the method goes to 806 to get a new current frame from the video sequence. At 818, if there are no more frames to be processed, then the method is done.

In some embodiments, other methods for selecting source frame and target frames than shown in FIG. 8 may be used. For example, in some embodiments, a single source frame or a range of source frames may be selected that best maps to all the target frames, rather than selecting a suitable source frame at each iteration as indicated at 808 of FIG. 8.

The elements of the method illustrated in FIG. 8 will be further described below.

Finding and Predicting Feature Tracks

A rough mask around the occluding object to be removed may be obtained as input to the video completion technique. FIG. 10B illustrates an example rough mask around the lightpost shown in FIG. 10A. At elements 800 through 804 of FIG. 8, the video completion technique creates a prediction of the background scene motion had there not been an occluding object. Embodiments may assume that the background is static, so this apparent background scene motion is caused by camera motion. A goal is to create correspondences between scene points behind the occluding object and points in other frames where the background is visible. At 800 of FIG. 8, the video completion technique finds motion tracks or trajectories through the video, in at least some embodiments using Kanade-Lucas-Tomasi (KLT) feature tracker technology. In other embodiments, other feature tracking technologies may be used to find motion tracks or trajectories. In at least some embodiments, the video completion technique may remove short tracks and tracked points under the mask. After removing the short tracks and the tracked points under the mask, the video completion technique may build a matrix of the motion tracks. In at least some embodiments, in this sparse matrix, each column represents a frame. A row of the matrix represents a track (in at least some implementations, a track is actually spread over two rows, where the first row represents the x coordinate of the track and the second row represents the y coordinate). Assuming that there are T tracks and F frames, this yields a sparse 2T×F matrix. Embodiments may leverage the fact that the motion of a static scene under general camera motion resides in a subspace that is at most 9 dimensions. Thus, as indicated at 802 of FIG. 8, embodiments may factor the matrix into a 2T×9 matrix and a 9×F matrix. As indicated at 804 of FIG. 8, the subspace may be used to predict background locations behind the input mask. To accomplish this, the factored matrices may be multiplied to get back the track matrix; however, where the original matrix had missing data, this new matrix will be dense. The new entries in the matrix provide predictions of where the tracks would be if they were not occluded in the original video. For further description of a factorization technique that may be used, or adapted for use, in at least some embodiments, see the section titled Filtering with subspace constraints.

Selecting the Source Frame

As indicated at 808 of FIG. 8, the video completion technique finds a suitable source frame for at least partially filling in the hole in the current frame. There are several factors to be considered when selecting the frame to use as the source frame for filling a hole in the target frame. Each of these factors may influence the strategy selected for selecting a source frame. A first factor is temporal coherence. If two different source frames are used to fill holes in neighboring target frames, the result in each target frame may look acceptable, but the final video may have popping or flickering artifacts. A second factor is coverage. If a source frame does not completely fill the hole, then multiple passes of the method may be needed to completely fill the hole in that target frame. This increases the running time of the method, and has the potential to introduce more compositing artifacts, as there may be more seams in the final result. While this case is not always avoidable as the entire occluded region may not be visible in any one frame, embodiments may try to minimize the number of composites necessary for filling the hole. A third factor is temporal distance. Frames that are temporally close to one another may need less drastic warps to align their content. Less drastic warps may provide better results in the final composite, as there are fewer artifacts introduced by the warp.

Any of several techniques for selecting a source frame may be used in embodiments of the video completion technique. The following describes several such techniques that may be used in various embodiments; however, note that other techniques than those described may be used. Note that these various techniques may involve some trade-offs in the above-described factors.

In some embodiments of the video completion technique, a technique for selecting a source frame may be used that either picks the middle frame of the video as the source frame or that uses an ad hoc method to try to find a source frame temporally closest to the target frame that does not overlap. This calculation is done from the track information, so it is not always completely accurate, as the tracks provide only sparse samples.

In some embodiments of the video completion technique, a technique for selecting a source frame may be used that looks over all frames in the video and finds the frame that would cover the largest part of the hole if it were used as the source frame. That frame is then used to fill or partially fill the hole in all other frames. The process of choosing a source frame and filling holes is repeated until all holes are filled. This approach is relatively simple to implement and reduces temporal coherence artifacts by using a small set of frames for all the composites. Finding such source frames may require performing the warp from every frame to every other frame to measure how much of the hole would be filled for this choice of source frame; however, this may be an expensive calculation. Alternatively the predicted tracks may be used as a proxy for the pixels. In this case, even if the choice of source frame is not optimal, it can be calculated just from the track data, which is comparatively fast.

In some embodiments of the video completion technique, a technique for selecting a source frame may be used that selects the source frame that is temporally closest to the target frame and that will cover the entire hole in the target frame. This heuristic minimizes the number of warps needed, and also tries to generate less drastic warps as the source and target frames are as close to one another as possible. However, since every target frame can have a different and unrelated source frame, this may cause temporal artifacts. Again the predicted tracks can be used in lieu of pixels.

In some embodiments, of the video completion technique a technique for selecting a source frame may be used that finds sequences of source frames that will be composited with sequences of target frames. This heuristic helps reduce the temporal coherence problems of the previous technique, and may get some of the benefit of using temporally close frames. However, finding sequences that are as long as possible is NP-hard, so in some embodiments a rough approximation may be used.

Warping Frames

As indicated at 810, once the predictions of scene points and a source frame where the background is visible are obtained, the video completion technique warps the source frame to align it with the target frame. In at least some embodiments, a content-preserving warping technique may be leveraged that applies a homography that models a global transformation and then applies a content preserving warp based on the track points. The warp minimizes the energy term, E, which is the weighted sum of two energy terms $E_d$, the data term based on the predicted track points, and $E_s$, a stiffness term. α is a weight that lets us tune the influence of the individual energy terms:

$$E = E_d + \alpha E_s \tag{11}$$

In at least some embodiments of the video completion technique, the content-preserving warping technique may be applied to warp a source frame so that it aligns well with the target frame. This allows the video completion technique to easily composite pixels from the warped source frame and fill the hole in the target frame. Compositing is discussed in a later section.

The content-preserving warping technique may provide good results if the background can be approximated by a plane. However, if the background has many depth discontinuities, the warped region may not line up with the surrounding image in the target frame. In order to correct the alignment, in at least some embodiments, an image consistency energy term, $E_{IC}$, may be added to the energy sum:

$$E_{IC} = \Sigma_j M(j)[I_s(W^{-1}(j,p+\Delta p)) - I_t(j)]^2 \tag{12}$$

Figure 9:
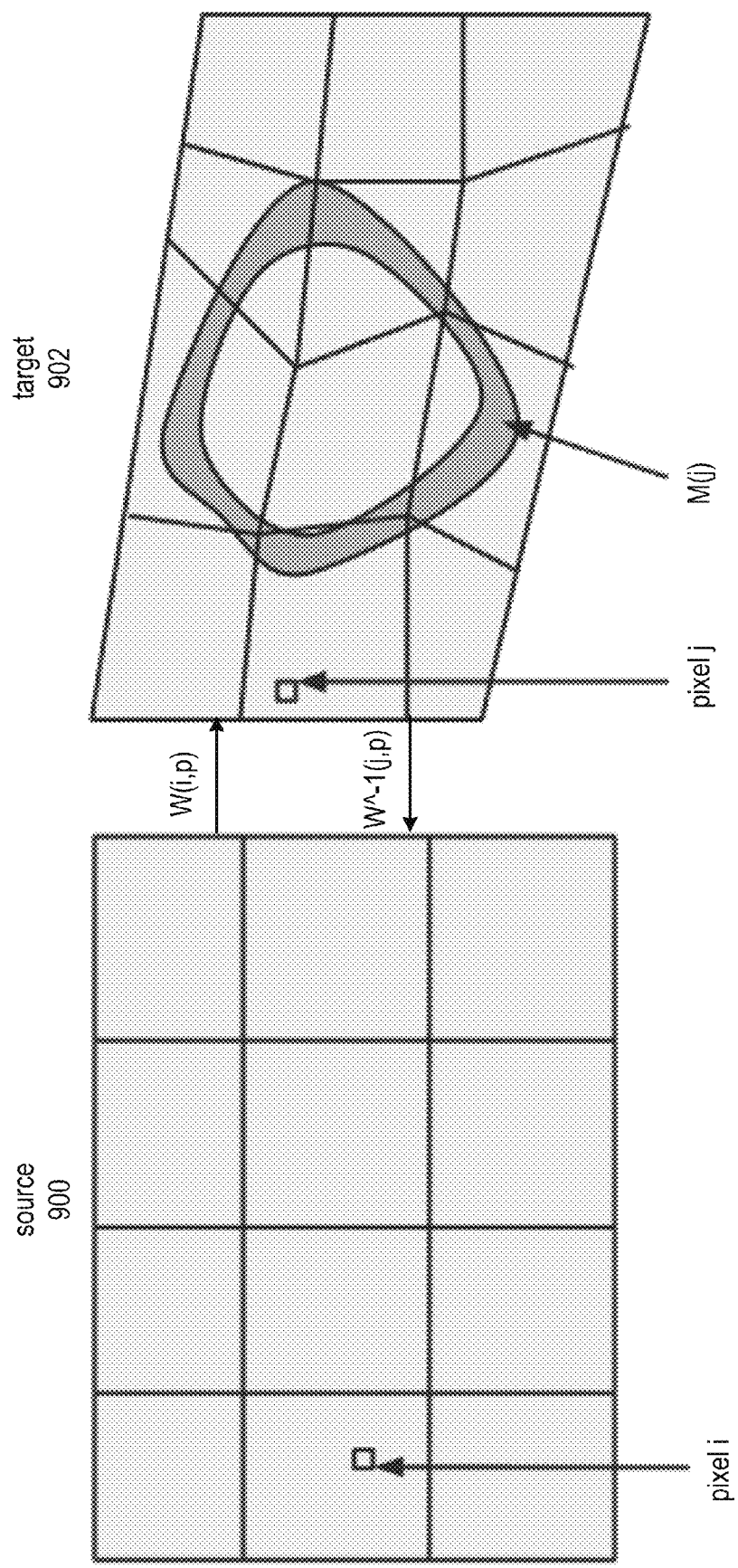
FIG. 9 is provided to illustrate image consistency energy concepts between source and target images.

FIG. 9 is provided to graphically illustrate that the image consistency energy measures the difference between the target image 902 pixel value and the pixel value of a potential warp of the source image 900. The image consistency energy term, $E_{IC}$, may act to minimize the difference in pixel values between the source and target images in a band, M(j), around the hole to fill; an example of M(j) is shown in target frame 902 in FIG. 9. The image consistency energy term does this by trying to optimize the vector p, which are the parameters of the warp. In this case, vector p represents the mesh coordinates of the content preserving warp. The warp may be represented as a function of the pixel value and the parameters, W(i; p). The image consistency energy term sums the squared difference over each pixel, j, in the target image $I_t$ with the associated pixel value in the source image $I_s$. To get the pixel value in the source image, the warp may be inverted to find the pixel in the source 900 for the given pixel in the target 902. This is given by $W^{-1}(j,p)$. The method minimizes the new weighted sum of the three energy terms:

$$E = E_d + \alpha E_s + \beta E_{IC} \qquad (13)$$

Since the image consistency energy term is non-linear, in at least some embodiments, the energy minimization may be formulated as a non-linear least squares problem. In at least some embodiments, the linear term of the Taylor series may be used to approximate the function. In at least some embodiments, the warp without the image consistency term may be used as an initialization; the method may then iteratively solve for changes to the parameters, $\Delta p$, and apply that change to p. This process may be repeated until $\Delta p$ is sufficiently small. However, non-linear least squares problems like this may get stuck in local minima. In at least some embodiments, to avoid local minima, a Gaussian pyramid of each image may be formed, and p may be solved for at each layer of the pyramid, working from the blurriest (lowest resolution) image towards the original, full-resolution sharp image.

Non-linear least squares optimization has two important speed vs. quality trade-offs. Since the method uses an approximation of the function, it may produce poor results when the approximation is far from the true value. In at least some embodiments, to mitigate this, instead of updating the parameters by simply adding $\Delta p$ top, the method may use a multiplier that reduces the step size so that the update becomes $p := \alpha \Delta p$ where $\alpha \in (0,1]$. Larger step sizes (values of $\alpha$) may allow p to converge in fewer iterations, but may be more prone to error. Another consideration is when to stop the iterative process. Terminating in fewer iterations may be faster, but may produce worse results. In at least some embodiment, the method tracks the percent change in the sum of squared image differences that the energy term tries to minimize. The iterations are terminated when the percent change is sufficiently small, or when a maximum number of iterations has been reached.

Results of the Video Completion Technique

Figure 10A:
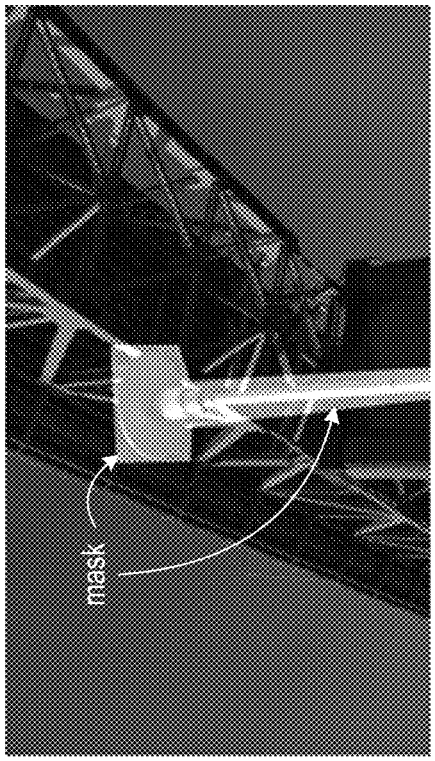
FIGS. 10A through 10D show example results of the video completion technique, according to at least some embodiments.
Figure 10B:
Figure 10C:
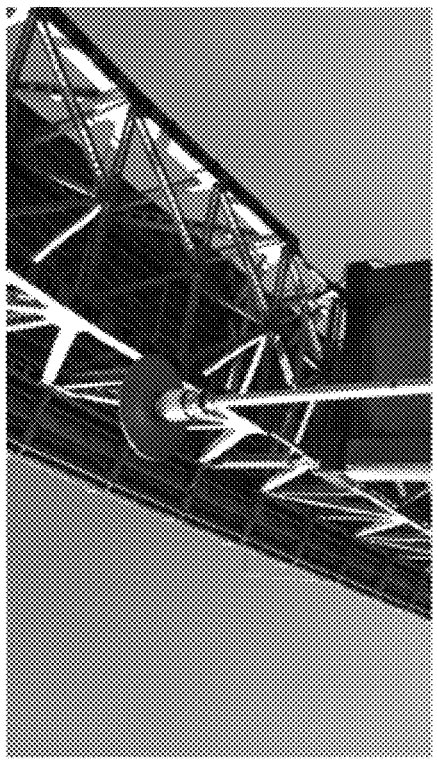
Figure 10D:

FIGS. 10A through 10D show example results of the video completion technique, according to at least some embodiments. FIG. 10A shows an original video frame. FIG. 10B shows a user-selected region to be filled in. The region may be represented as a rough mask for the occluding object (in this example, a lamp post). FIG. 10C shows video completion technique results using a homography and content preserving warp technique that does not include the image consistency energy terms. This image includes visible artifacts. FIG. 10D shows video completion technique results using a homography and content preserving warp technique that does include the image consistency energy terms, as described herein. Video completion using the image consistency energy terms fixes parallax effects and removes or reduces artifacts, as can be seen by comparing FIG. 10D to FIG. 10C.

Figure 11:
FIG. 11 shows example results of the video completion technique applied to remove a man walking through a courtyard in the frames of a video sequence, according to at least some embodiments.

FIG. 11 shows example results of the video completion technique applied to remove a man walking through a courtyard in several frames of a video sequence, according to at least some embodiments. The left column shows the input frames, and the right column shows the output frames. The first row is the first frame in the sequence, the second row is the middle frame, and the last row the final frame.

Compositing

Any of several techniques for compositing a source frame into a target frame may be used in embodiments of the video completion technique. The following describes several such compositing techniques that may be used in various embodiments; however, note that other compositing techniques than those described may be used.

In some embodiments of the video completion technique, the compositing technique may simply copy pixels from the source frame to the "hole" region of the target frame.

In some embodiments of the video completion technique, the compositing technique that is used may be a technique for transitioning between images such as a blending flaps, cross fade, or linear ramp technique; these techniques tend to be fast and have a low likelihood of introducing temporal coherency artifacts.

In some embodiments of the video completion technique, the compositing technique that is used may be a gradient domain blending technique. An example gradient domain blending technique that may be used is described in *Poisson image editing*. *[ACM Transactions on Graphics*, Perez, P. et al. In *Proceedings of SIGGRAPH* 22(3), July 2003.]

In some embodiments of the video completion technique, the compositing technique that is used may be a combination of a gradient domain blending technique and a graph cuts technique, for example as described in *Interactive Digital Photomontage [ACM Transactions on Graphics*, Agarwala, A. et al. In *Proceedings of SIGGRAPH* 2004, 2004.]

In some embodiments of the video completion technique, the compositing technique may be a 3D graphcut technique, for example as described in *Graphcut textures: image and video synthesis using graph cuts [ACM Transactions on Graphics*, Kwatra, V., et al. In *Proceedings of SIGGRAPH* 2003, July 2003.]

An alternative approach that may be used in compositing in some embodiments of the video completion technique is to use an augmented randomized correspondence algorithm for structural image editing that operates on pre-warped frames to fill the hole in each frame individually. This technique may avoid the problems of the image consistency term and the blending questions. The patch matching technique may use warped frames as a pixel source, so it does not need to compensate for the change in view point. Further, the predicted motion trajectories may be used as soft constraints to limit the search space that the randomized correspondence algorithm uses to find a candidate patch. An example randomized correspondence algorithm that may be used is the PatchMatch algorithm as described in *PatchMatch: A Randomized Correspondence Algorithm for Structural Image Editing. [ACM Transactions on Graphics*, Barnes, C., Shechtman, E., Finkelstein, A. and Goldman, Dan B. In *Proc. SIGGRAPH* 28(3), August 2009.] However, other algorithms or techniques may also be used.

These various techniques that may be used for compositing a source frame into a target frame in various embodiments are given by way of example; other techniques may be used, or combinations or variations of the example techniques may be used.

Uncropping Stabilized Video

The above discussion has focused on applying the video completion technique to the problem of filling regions inside a frame for video processing tasks such as object removal and retouching. However, embodiments of the video completion technique may also be used to fill a region outside the frame, for example the cropped region that may result from the application of a video stabilization technique. Video stabilization techniques generally require cropping the input video to achieve the stabilized result. By treating the outside of the frame as the region to fill, embodiments of the video completion technique may effectively uncrop the stabilized video to produce a stabilized result at or near the original resolution.

Uncropping is in some ways an easier problem than hole filling, since there are fewer seams that need to line up correctly in the final composite. On the other hand, the video completion technique may rely at least in part on motion trajectory predictions in the area to fill. The regions that need uncropping in video stabilization are also the ones that were producing the jitter in the original video. This means that the regions may have motion trajectories that are too short to use in a meaningful way. Thus, in some embodiments of the video completion technique, for video completion of videos that have been cropped by a video stabilization technique, the video completion technique may use trajectories near the region being filled instead of trajectories that are in the region.

Example Implementations of the Video Completion Techniques

Figure 12:
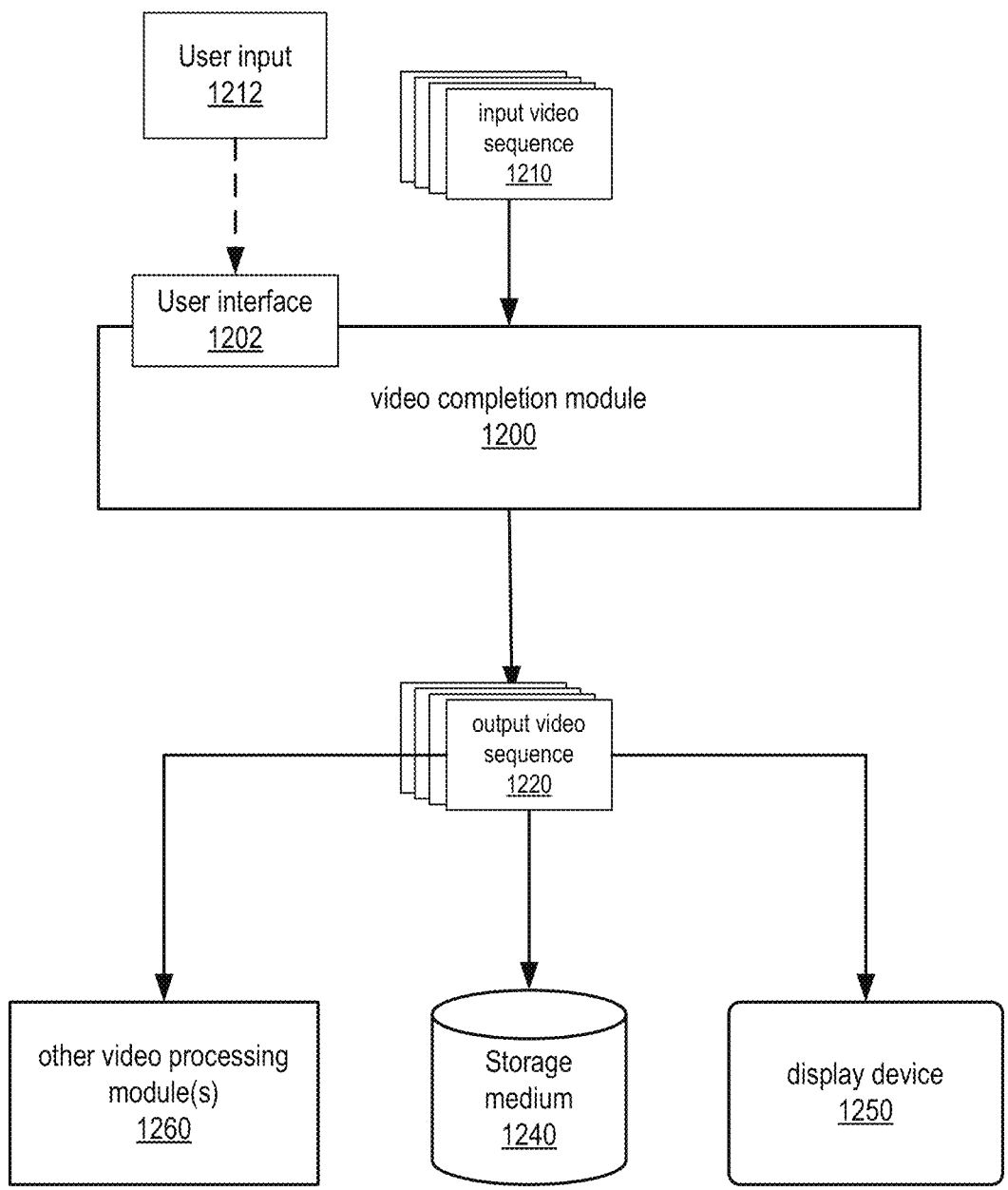
FIG. 12 illustrates an example video completion module that may implement the video completion methods as illustrated in FIGS. 8 through 11.

Embodiments of the video completion technique as described herein may be implemented in software, hardware, or a combination thereof. For example, embodiments of the video completion technique may be performed by a video completion module implemented by program instructions stored in a computer-readable storage medium and executable by one or more processors (e.g., one or more CPUs or GPUs). Embodiments of a video completion module may, for example, be implemented as a stand-alone application, as a module of an application, as a plug-in for applications including image or video processing applications, and/or as a library function or functions that may be called by other applications such as image processing or video processing applications. Embodiments of the video completion module may be implemented in any image or video processing application, or more generally in any application in which video sequences may be processed. Example applications in which embodiments may be implemented may include, but are not limited to, Adobe® Premiere®. "Adobe" and "Adobe Premiere" are either registered trademarks or trademarks of Adobe Systems Incorporated in the United States and/or other countries. An example video completion module that may implement the video completion methods as described herein is illustrated in FIG. 12. An example computer system on which a video completion module may be implemented is illustrated in FIG. 14.

In addition to computer system implementations, embodiments of the video completion technique as described herein may be implemented in other devices, for example in digital video cameras, as a software module, hardware module, or a combination thereof.

FIG. 12 illustrates an example video completion module that may implement the video completion methods as illustrated in FIGS. 7 through 11. FIG. 14 illustrates an example computer system on which embodiments of module 1200 may be implemented. Video completion module 1200 receives as input a video sequence 1210, for example a video sequence in which an object, specified by a mask, is to be removed, or a stabilized video for which a cropped border region is to be restored. In some embodiments, module 1200 may receive user input 1212 via user interface 1202 specifying one or more video completion parameters or data, such as a mask for an object to be removed. Module 1200 then applies a video completion technique as described herein, according to user input 1212 received via user interface 1202, if any. Module 1200 generates as output video sequence 1220 with an object removed and the resulting holes filled, or alternatively a stabilized video with a previously cropped border region restored. Output video sequence 1220 may, for example, be stored to a storage medium 1240, such as system memory, a disk drive, DVD, CD, etc. Output video sequence 1220 may, in addition or instead, be displayed to a display device 1250. Output video sequence 1220 may, in addition or instead, be provided to one or more other video processing modules 1260 for further processing.

Video Stabilization and Video Completion

Figure 13:
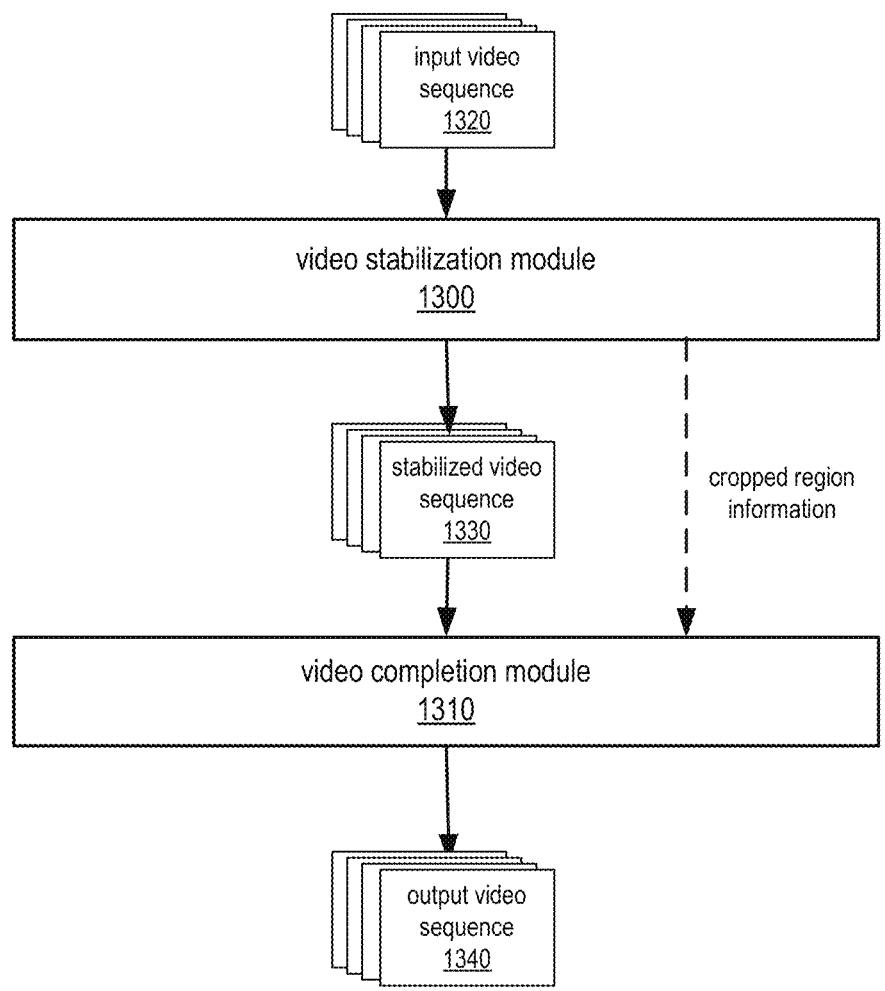
FIG. 13 illustrates the video completion technique applied to filling in cropped stabilized video sequences produced by the subspace video stabilization technique, according to some embodiments.

Embodiments of the video completion technique described herein may be used in or with a video stabilization technique, for example with embodiments of the subspace video stabilization technique as previously described, to restore the cropped border regions of stabilized videos output by the video stabilization technique. FIG. 13 illustrates the video completion technique applied to filling in cropped stabilized video sequences produced by a video stabilization technique, according to some embodiments. A video stabilization module 1300 may receive a video sequence 1320 to be stabilized. The video stabilization module 1300 may stabilize the video sequence, for example according to the subspace video stabilization technique as illustrated in FIGS. 1 and 5, to generate a stabilized video sequence 1330. However, applying a video stabilization technique may result in some cropping around the edges of the video frames. Therefore, the stabilized video sequence 1330 may be passed to a video completion module 1310 that implements an embodiment of the video completion technique, for example as illustrated in FIGS. 7, 8, and 12. In some embodiments, a mask or other information identifying the cropped region may also be passed to the video completion module 1310. The video completion module 1310 may then restore the cropped region in the video frames according to the video completion technique to generate an output video sequence 1340 with the cropped region restored. Output video sequence 1340 may, for example, be stored to a storage medium, such as system memory, a disk drive, DVD, CD, etc., displayed to a display device, and/or provided to one or more other video processing modules for further processing.

FIG. 13 shows video completion module 1310 as external to video stabilization module 1300. However, in some embodiments, the video completion technique as described herein may be implemented as a submodule of a video stabilization module. For example, referring to FIG. 5, the video completion technique as described herein may be implemented as a submodule of subspace video stabilization module 500 that receives an output video sequence from warping technique 512 and restores cropped edges of the video frames before the module 500 outputs warped video sequence 570.

While the above generally describes the video completion technique applied to stabilized videos generated by the subspace video stabilization technique as described herein, embodiments of the video completion technique may be applied to the video output of other video stabilization techniques. More generally, embodiments of the video completion technique may be applied to the video output of any video processing technique that crops edges of video frames, removes objects from video frames, or otherwise removes content from video frames to restore missing content, for example holes or border regions, in the video sequences.

Example System

Embodiments of a video completion module and/or of a subspace video stabilization module as described herein may be executed on one or more computer systems, which may interact with various other devices. One such computer system is illustrated by FIG. 14. In different embodiments, computer system 1000 may be any of various types of devices, including, but not limited to, a personal computer system, desktop computer, laptop, notebook, or netbook computer, mainframe computer system, handheld computer, workstation, network computer, a camera, a digital video camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the video completion methods and/or the subspace video stabilization methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a video completion module and/or of a subspace video stabilization module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of a video completion module and/or of a subspace video stabilization module as described herein, and data storage 1035, comprising various data accessible by program instructions 1025. In one embodiment, program instructions 1025 may include software elements of embodiments of a video completion module and/or of a subspace video stabilization module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a video completion module and/or of a subspace video stabilization module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    obtaining an input video sequence of a scene comprising a plurality of frames and an indication of an object to be removed from the frames of the input video sequence;
    tracking feature points in the input video sequence to generate feature tracks;
    factoring the feature tracks into a low-dimensional subspace;
    generating a prediction of background scene motion according to the low-dimensional subspace; and
    processing a frame of the input video sequence designated as a target frame to fill a region in the target frame occluded by the indicated object with background content from unoccluded regions of one or more other frames of the input video sequence designated as source frames according to the prediction of background scene motion, the occluded region in the target frame is filled using one said unoccluded region from one said source frame at a time such that:
        if the one said unoccluded region from the one said source frame is determined to cause an entirety of the occluded region to be filled then compositing the one said source frame to fill the occluded region; or
        if the one said unoccluded region from the one said source frame is determined not to cause the entirety of the occluded region to be filled, then compositing the one said source frame to fill any portion of the occluded region that the background content of the one said source frame is determined to fill, and selecting a next said source frame to fill at least part of a remaining portion of the occluded region.

2. The method as recited in claim 1, further comprising processing each frame in the input video sequence that includes the indicated object.

3. The method as recited in claim 1, wherein processing the target frame according to the prediction of background scene motion comprises:
    identifying the unoccluded regions of the one or more source frames according to the prediction of background scene motion; and
    warping each source frame to the target frame according to the prediction of background scene motion.

4. The method as recited in claim 3, wherein the warping is performed according to a content-preserving warp technique.

5. The method as recited in claim 3, further comprising applying one or more image consistency energy terms to improve alignment between the target frame and each warped source frame prior to compositing the warped source frame.

6. A system, comprising:
    at least one processor; and
    a memory comprising program instructions, that are executable by the at least one processor to perform operations comprising:

obtaining an input video sequence of a scene comprising a plurality of frames and an indication of an object to be removed from the frames of the input video sequence;

generating a prediction of background scene motion in the input video sequence; and processing a frame of the input video sequence designated as a target frame to fill a region in the target frame occluded by the indicated object with background content from unoccluded regions of one or more other frames of the input video sequence designated as source frames, the occluded region in the target frame is filled using one said unoccluded region from one said source frame at a time such that:

if the one said unoccluded region from the one said source frame is determined to cause an entirety of the occluded region to be filled then compositing the one said source frame to fill the occluded region; or if the one said unoccluded region from the one said source frame is determined not to cause the entirety of the occluded region to be filled, then compositing the one said source frame to fill any portion of the occluded region that the background content of the one said source frame is determined to fill, and selecting a next said source frame to fill at least part of a remaining portion of the occluded region.

7. The system as recited in claim 6, wherein the processing is performed on each frame in the input video sequence that includes the indicated object.

8. The system as recited in claim 6, wherein each of the one or more source frames is warped to the target frame according to the prediction background scene motion, including applying a content-preserving warp technique.

9. The system as recited in claim 6, wherein one or more image consistency terms are applied to each of the one or more source frames to improve alignment with the target frame, the image consistency energy terms acting to minimize differences in pixel values between a warped one said source frame and the target frame in a band around the region in the target frame occluded by the indicated object.

10. The system as recited in claim 6, wherein generating the prediction of background scene motion in the input video sequence comprises applying a subspace constraint technique that:

finds and tracks feature points in the input video sequence to generate feature tracks;

factors the feature tracks into a low-dimensional subspace; and generates the prediction of background scene motion according to the low-dimensional subspace.

11. A computer-readable memory storing program instructions that are executable on a computer to perform operations comprising:

obtaining an input video sequence of a scene comprising a plurality of frames and an indication of an object to be removed from the frames of the input video sequence;

generating a prediction of background scene motion in the input video sequence; and processing a frame of the input video sequence designated as a target frame to fill a region in the target frame occluded by the indicated object with background content from unoccluded regions of one or more other frames designated as source frames according to the prediction of background scene motion, the occluded region in the target frame is filled using one said unoccluded region from one said source frame at a time such that:

if the one said unoccluded region from the one said source frame is determined to cause an entirety of the occluded region to be filled then compositing the one said source frame to fill the occluded region; or if the one said unoccluded region from the one said source frame is determined not to cause the entirety of the occluded region to be filled, then compositing the one said source frame to fill any portion of the occluded region that the background content of the one said source frame is determined to fill, and selecting a next said source frame to fill at least part of a remaining portion of the occluded region.

12. The computer-readable memory as recited in claim 11, wherein the processing is performed on each frame in the input video sequence that includes the indicated object.

13. The computer-readable memory as recited in claim 11, wherein each of the one or more source frames is warped to the target frame according to the prediction background scene motion and according to a content-preserving warp technique.

14. The computer-readable memory as recited in claim 11, wherein one or more image consistency terms are applied to each of the one or more source frames to improve alignment with the target frame, the image consistency energy terms acting to minimize differences in pixel values between the source frames and the target frame in a band around the region in the target frame occluded by the indicated object.

15. The computer-readable memory as recited in claim 11, wherein generating the prediction of background scene motion in the input video sequence comprises applying a subspace constraint technique that:

finds and tracks feature points in the input video sequence to generate feature tracks;

factors the feature tracks into a low-dimensional subspace; and generates the prediction of background scene motion according to the low-dimensional subspace.

16. A computer-readable memory storing program instructions that are executable on a computer to perform operations comprising:

obtaining an input video sequence of a scene comprising a plurality of frames that have been cropped;

tracking feature points in the input video sequence to generate feature tracks;

factoring the feature tracks into a low-dimensional subspace; and generating the prediction of background scene motion according to the low-dimensional subspace; and processing each frame of the input video sequence designated as a target frame to fill a cropped region in the target frame with content from background regions of one or more other frames of the input video sequence designated as source frames according to the prediction of background scene motion, the cropped region in the target frame is filled using one said background region from one said source frame at a time such that:

if the one said background region from the one said source frame is determined to cause an entirety of the cropped region to be filled then compositing the one said source frame to fill the cropped region; or if the one said background region from the one said source frame is determined not to cause the entirety of the cropped region to be filled, then compositing the one said source frame to fill any portion of the cropped region that the content from the background regions of the one said source frame is determined to fill, and selecting a next said source frame to fill at least part of a remaining portion of the cropped region.

17. The computer-readable memory as recited in claim 16, wherein processing the target frame, comprises:
   identifying the background regions of the one or more source frames according to the prediction of background scene motion; and
   warping each source frame to the target frame according to the prediction of background scene motion.

18. The computer-readable memory as recited in claim 17, wherein the warping is performed according to a content-preserving warp technique.

19. The computer-readable memory as recited in claim 17, wherein the operations further comprise applying one or more image consistency energy terms to improve alignment between the target frame and each warped source frame prior to said compositing.

20. The computer-readable memory as recited in claim 16, wherein the input video sequence is a stabilized output video sequence generated according to a video stabilization technique that generates the stabilized output video sequence from an original video sequence.

\* \* \* \* \*